(12) United States Patent
Zhou et al.

(10) Patent No.: US 11,364,547 B2
(45) Date of Patent: Jun. 21, 2022

(54) CHUCK WITH MODE CONTROL CLUTCH

(71) Applicants: APEX BRANDS, INC., Apex, NC (US); Jacobs Chuck Manufacturing Company, Ltd., Suzhou (CN)

(72) Inventors: Jichun Zhou, Suzhou (CN); Jinping He, Suzhou (CN); Tingwei Zeng, Suzhou (CN)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 16/766,319

(22) PCT Filed: Jan. 24, 2018

(86) PCT No.: PCT/CN2018/073917
§ 371 (c)(1),
(2) Date: May 22, 2020

(87) PCT Pub. No.: WO2019/144306
PCT Pub. Date: Aug. 1, 2019

(65) Prior Publication Data
US 2020/0368824 A1 Nov. 26, 2020

(51) Int. Cl.
*B23B 31/12* (2006.01)
(52) U.S. Cl.
CPC ........ *B23B 31/123* (2013.01); *B23B 31/1238* (2013.01); *B23B 2231/06* (2013.01); *B23B 2231/38* (2013.01)
(58) Field of Classification Search
CPC .............. B23B 31/1238; B23B 31/123; B23B 31/1246; B23B 2231/38; B23B 2231/06;
(Continued)

(56) References Cited

U.S. PATENT DOCUMENTS 5,465,983 A * 11/1995 Owens ................ B23B 31/001
279/157
6,173,972 B1 * 1/2001 Temple-Wilson .... B23B 31/123
279/150
(Continued)

FOREIGN PATENT DOCUMENTS

CN 1745941 A 3/2006
CN 2808373 Y 8/2006
(Continued)

OTHER PUBLICATIONS

International Search Report and Written Opinion from International Application No. PCT/CN2018/073917 filed on Jan. 24, 2018.

*Primary Examiner* — Chwen-Wei Su
(74) *Attorney, Agent, or Firm* — Burr & Forman, LLP

(57) ABSTRACT

A chuck for use with a power driver having a rotatable drive spindle is provided. The chuck may comprise a plurality of jaws, a front body, a nut, a rear body, and a clutch. The clutch may be configured to move between a working position and a jaw actuating position. In the working position, the clutch teeth may be engaged with the rear body teeth such that rotation of the rear body by the drive spindle rotates the clutch, the front body, and the jaws. In the jaw actuating position, the clutch teeth may not or need not be engaged with the rear body teeth and the rear body may be configured to rotate the nut relative to the front body to move the jaws relative to the front body.

19 Claims, 33 Drawing Sheets

(58) Field of Classification Search
CPC ..... Y10T 279/17615; Y10T 279/17632; Y10T 279/17641; Y10S 279/902
See application file for complete search history.

(56) References Cited

U.S. PATENT DOCUMENTS

| | | | |
|---|---|---|---|
| 6,488,287 B2 * | 12/2002 | Gaddis | B23B 31/123 |
| | | | 279/150 |
| 7,644,931 B2 * | 1/2010 | Mack | B23B 31/1238 |
| | | | 279/62 |
| 9,174,281 B2 * | 11/2015 | Schenk | B23B 31/1238 |
| 9,486,858 B2 * | 11/2016 | Schenk | B23B 31/1238 |
| 2009/0200758 A1 * | 8/2009 | Lam | B23B 31/1238 |
| | | | 279/62 |
| 2015/0115551 A1 * | 4/2015 | Schenk | B23B 31/1215 |
| | | | 279/63 |

FOREIGN PATENT DOCUMENTS

| | | | | |
|---|---|---|---|---|
| CN | 101491837 A | | 7/2009 | |
| CN | 201776466 U | | 3/2011 | |
| CN | 106660140 A | | 5/2017 | |
| GB | 2294220 A | * | 4/1996 | ......... B23B 31/1238 |
| GB | 2378144 A | * | 2/2003 | ........... B23B 31/123 |
| WO | 2017024544 A1 | | 2/2017 | |

* cited by examiner

CHUCK WITH MODE CONTROL CLUTCH

TECHNICAL FIELD

Example embodiments generally relate to chucks for use with power drivers including drills, and more particularly, relate to chucks having a control clutch.

BACKGROUND

Power drivers with rotating drive spindles are often operably coupled to a chuck that is adjustable in size to be able to attach various working bits, such as drill bits or other tools that rotated by the drive spindle. Chucks typically employ moveable jaws that are operable to adjust the diameter of an opening in the chuck for receiving a working bit. The jaws of conventional chucks may be adjusted by rotating an external sleeve relative to the jaws. As such, rotation of the sleeve may operate to change the size of the opening in the chuck for receiving a working bit. However, because the sleeve operates as a jaw opening size control for conventional chucks, the sleeve often rotates with the jaws when the power driver is in use. The high speed rotation of the sleeve can often cause issues such as safety concerns and damage to surfaces by marring nearby surfaces when the power driver is being used. Further, some chucks may permit the sleeve to be held stationary by a user while the power driver turns the drive spindle to change the size of the jaw opening. However, when performing this operation, many conventional chucks are designed such that the jaws still rotate with the drive spindle making it difficult to install, for example, a working bit in the jaw opening due to the rotation of the jaws.

SUMMARY OF SOME EXAMPLES

According to some example embodiments, a chuck for use with a power driver having a rotatable drive spindle is provided. The chuck may comprise a plurality of jaws, with each jaw including jaw teeth. The chuck may further comprise a front body. In this regard, the plurality of jaws may be configured to rotate with the front body about a center axis of the chuck. Further, the plurality of jaws may also be configured to move relative to the front body in an opening or closing direction. The chuck may further comprise a nut operably coupled with at least some of the jaw teeth of the jaws such that rotation of the nut relative to the front body moves the jaws relative to the front body. The chuck may also comprise a rear body including rear body teeth. In this regard, the rear body may be configured to rotate with a drive spindle of the power driver. Further, the chuck may further comprise a clutch including clutch teeth. The clutch may be operably coupled to the front body such that the clutch rotates with the front body. The clutch may be configured to move between a working position and a jaw actuating position. In the working position, the clutch teeth may be engaged with the rear body teeth such that rotation of the rear body by the drive spindle rotates the clutch, the front body, and the jaws. In the jaw actuating position, the clutch teeth may not or need not be engaged with the rear body teeth and the rear body may be configured to rotate the nut relative to the front body to move the jaws relative to the front body.

According to some example embodiments, another chuck for use with a power driver having a rotatable drive spindle is provided. The chuck may comprise a plurality of jaws with each jaw including jaw teeth. The chuck may further comprise a front body. The plurality of jaws may be configured to rotate with the front body about a center axis of the chuck. The plurality of jaws may also be configured to move relative to the front body in an opening or closing direction. The chuck may further comprise a sleeve operably coupled to the front body to permit rotational movement relative to the front body but not axial movement relative to the front body. The chuck may further comprise a nut operably coupled with at least some of the jaw teeth of the jaws such that rotation of the nut relative to the front body moves the jaws relative to the front body. The chuck may further comprise a rear body including rear body teeth. The rear body may be configured to rotate with a drive spindle of the power driver. The chuck may further comprise a clutch including clutch teeth. The clutch may be operably coupled to the front body such that the clutch rotates with the front body. The clutch may be configured to move between a working position and a jaw actuating position. In the working position, the clutch teeth may be engaged with the rear body teeth such that rotation of the rear body by the drive spindle rotates the clutch, the rear sleeve, the front body, and the jaws. In the jaw actuating position, the clutch teeth are not engaged with the rear body teeth and the rear body is configured to rotate the nut relative to the front body, the rear sleeve, and the clutch to move the jaws relative to the front body.

BRIEF DESCRIPTION OF THE DRAWINGS

Figure 1:
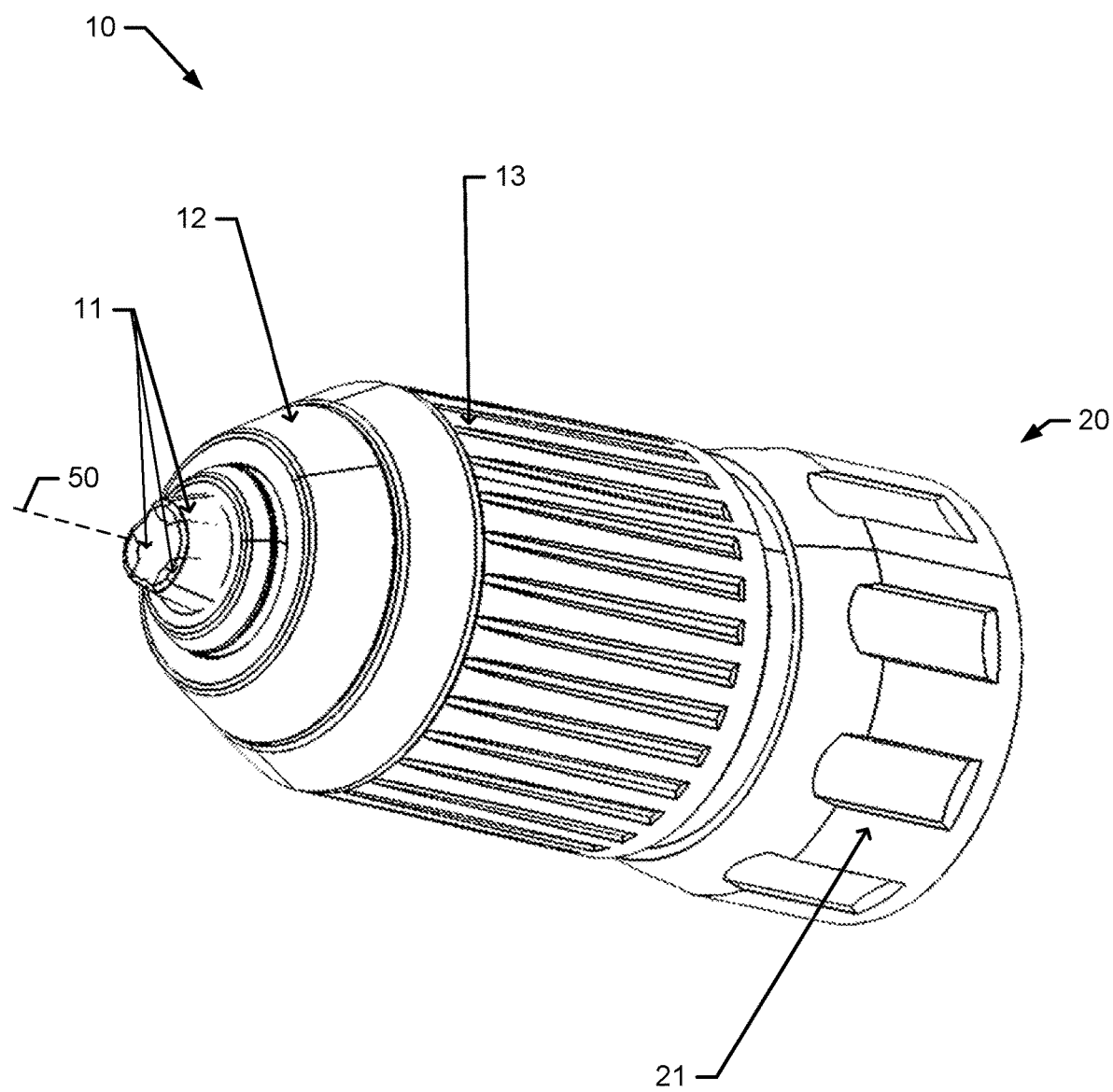
Figure 2:
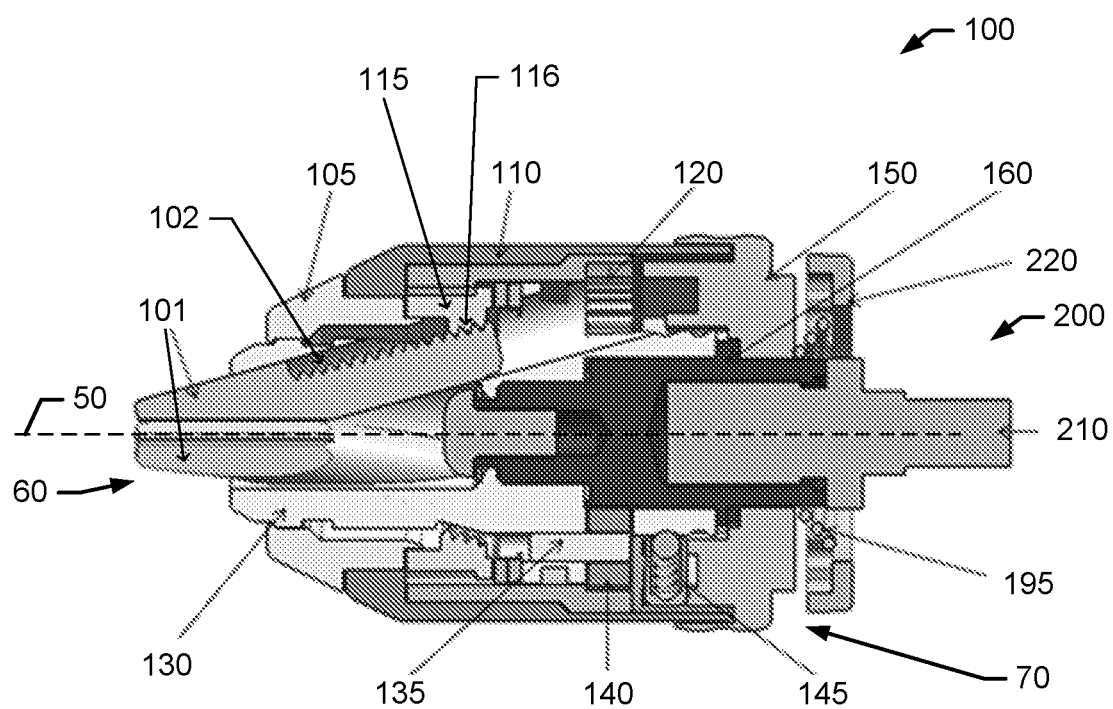
Figure 3:
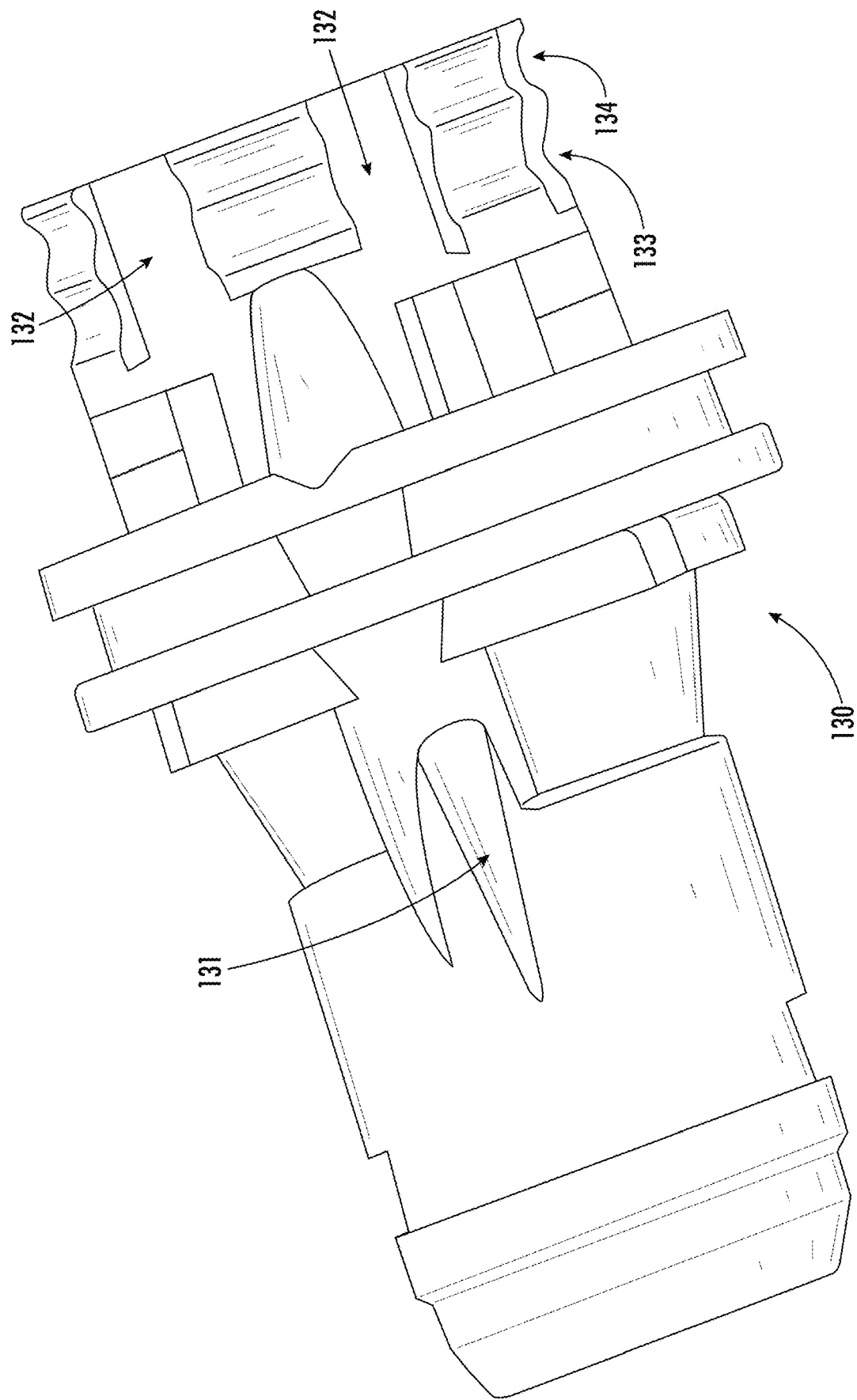
Figure 4:
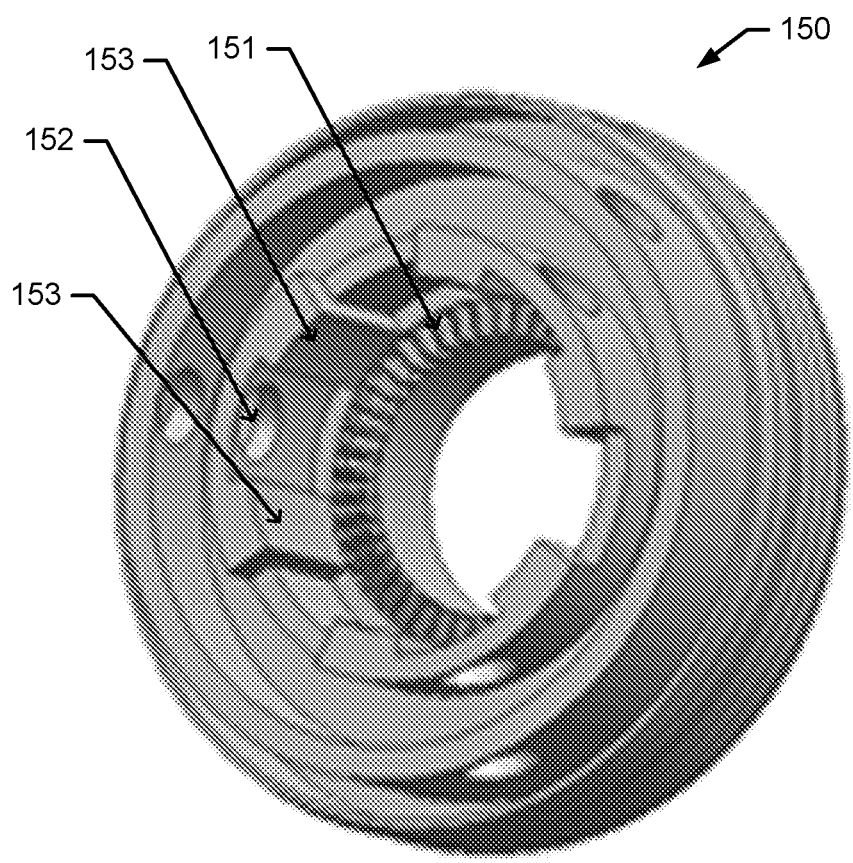
Figure 5:
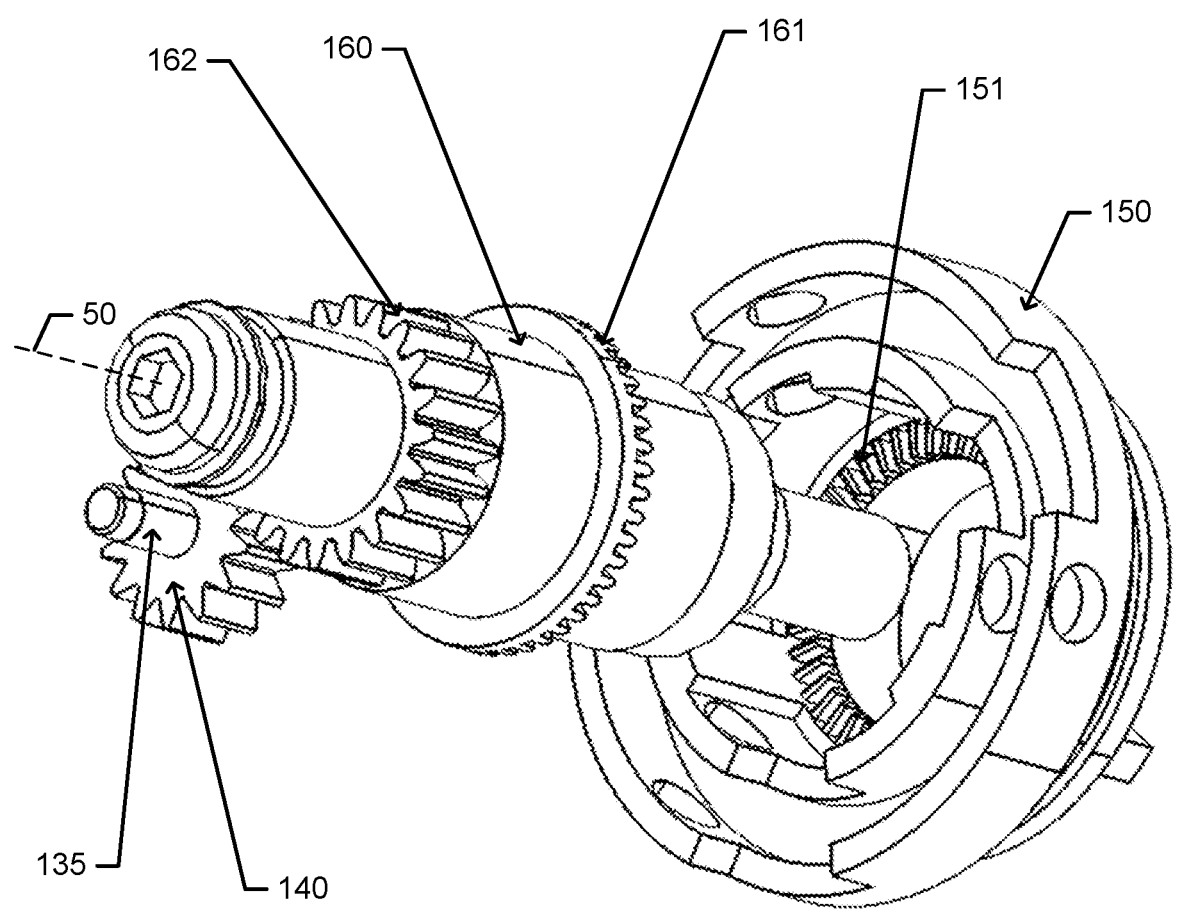
Figure 6:
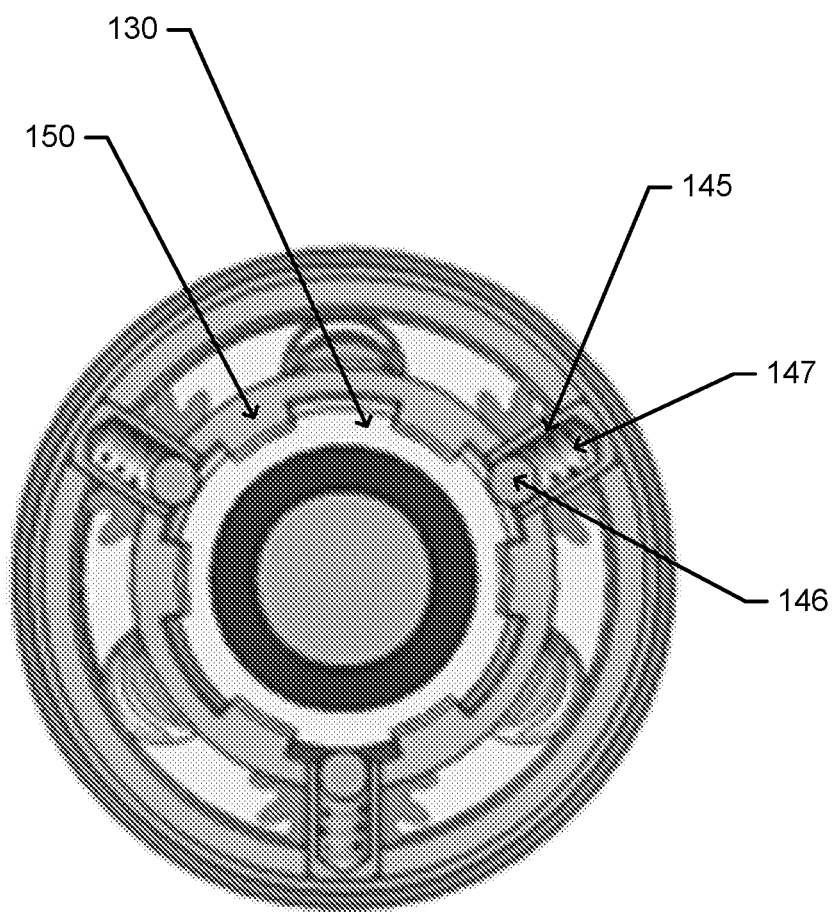
Figure 7:
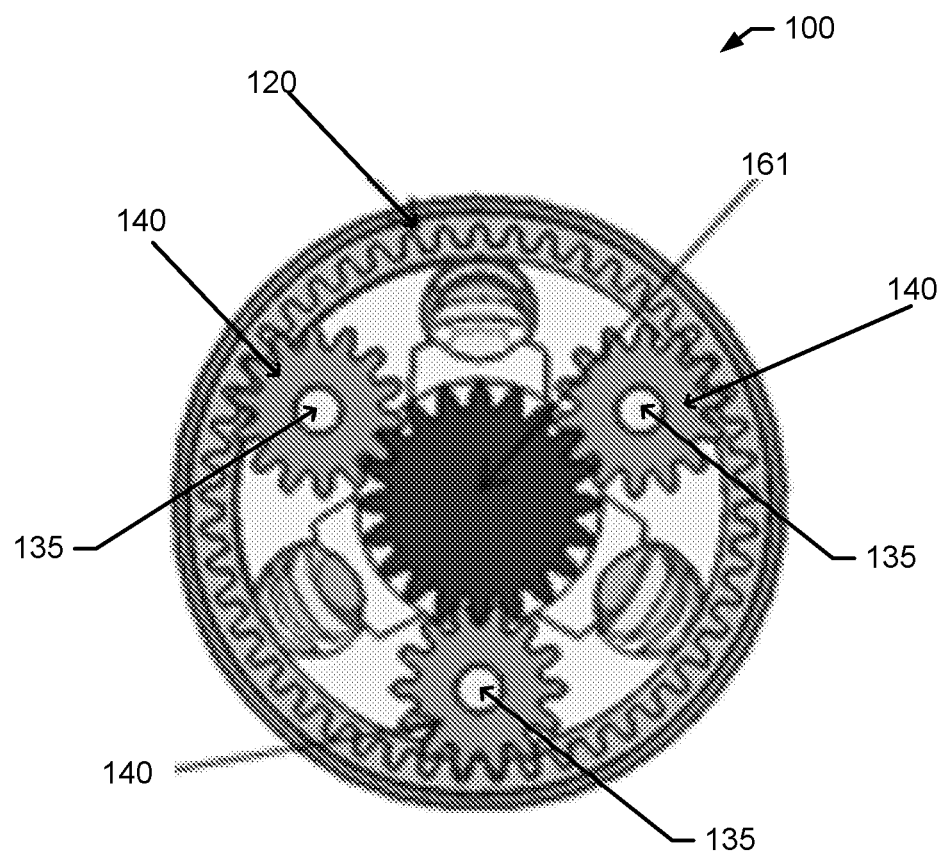
Figure 8:
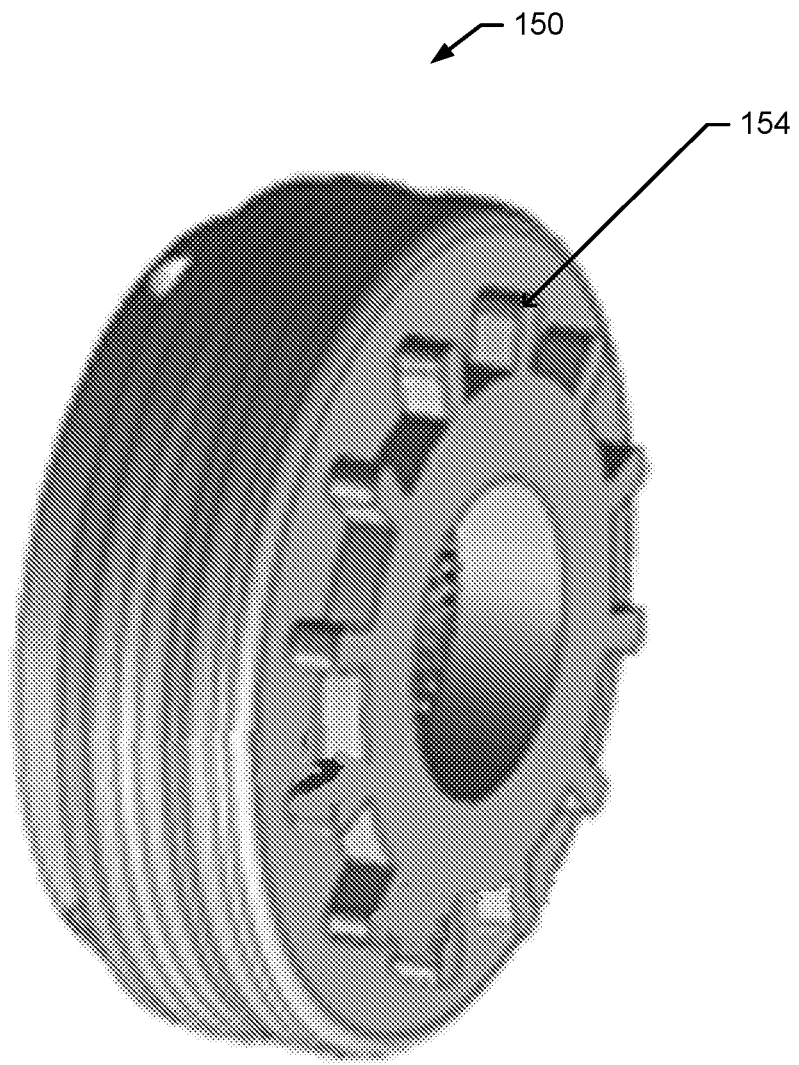
Figure 9:
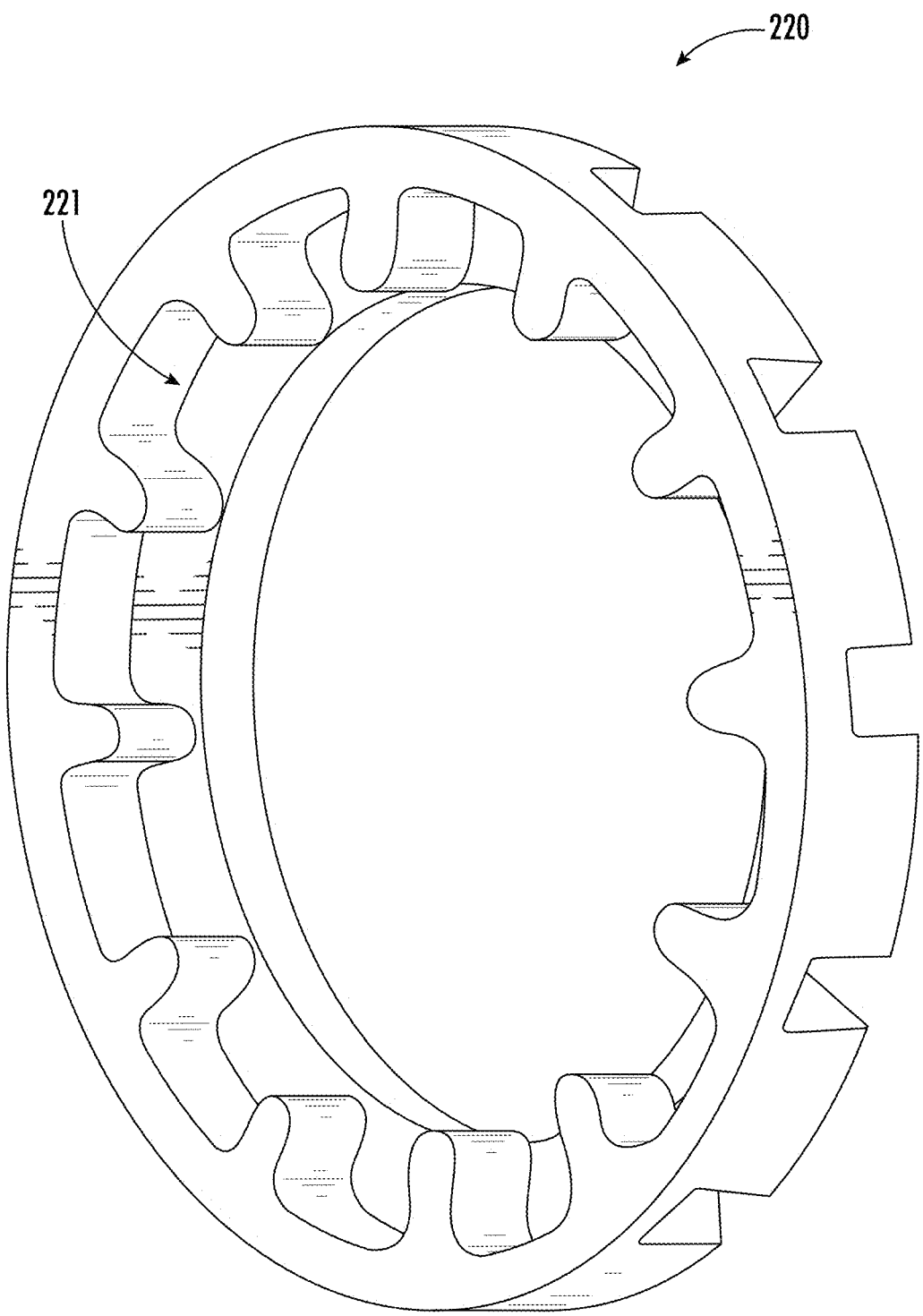
Figure 10:
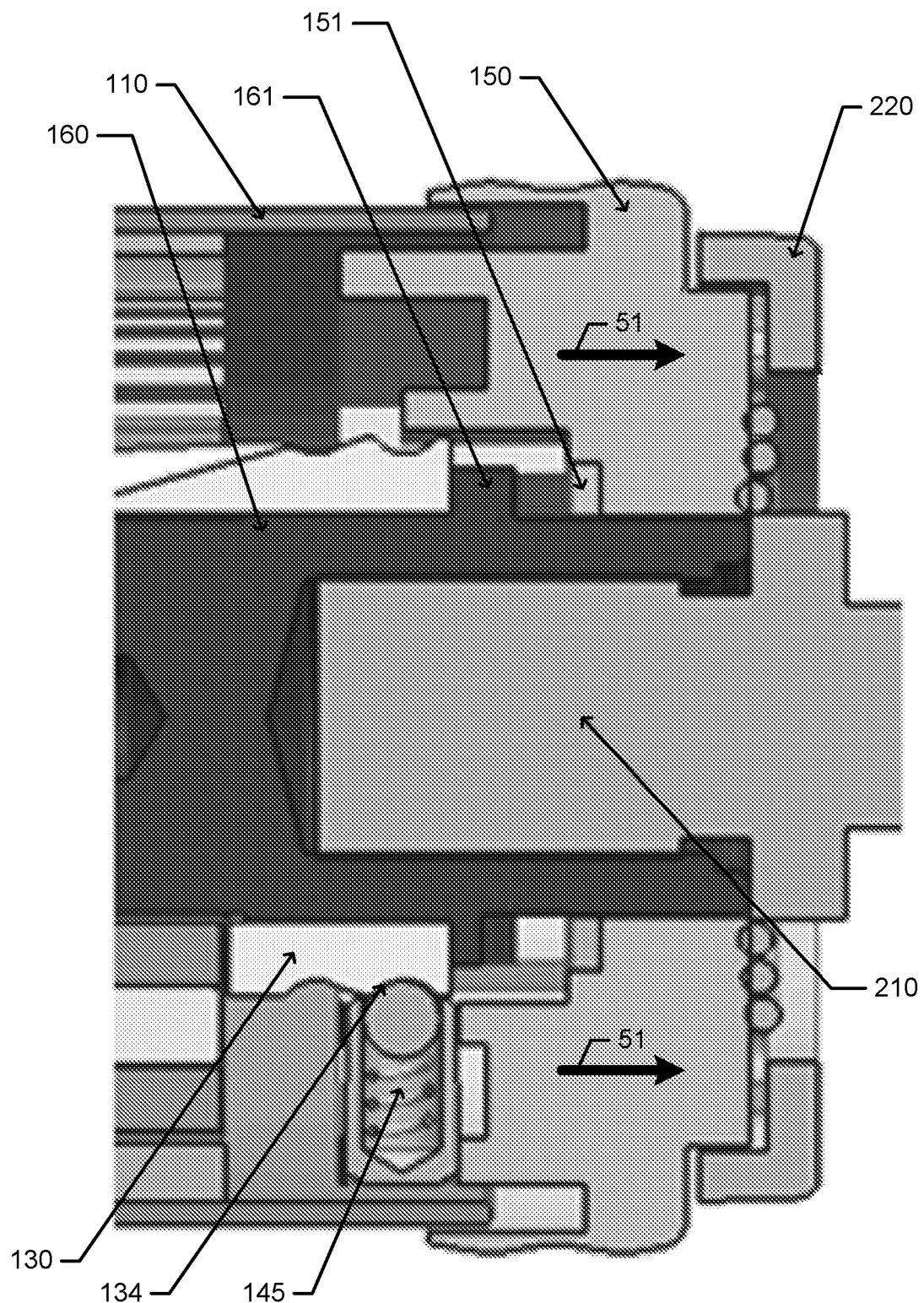
Figure 11:
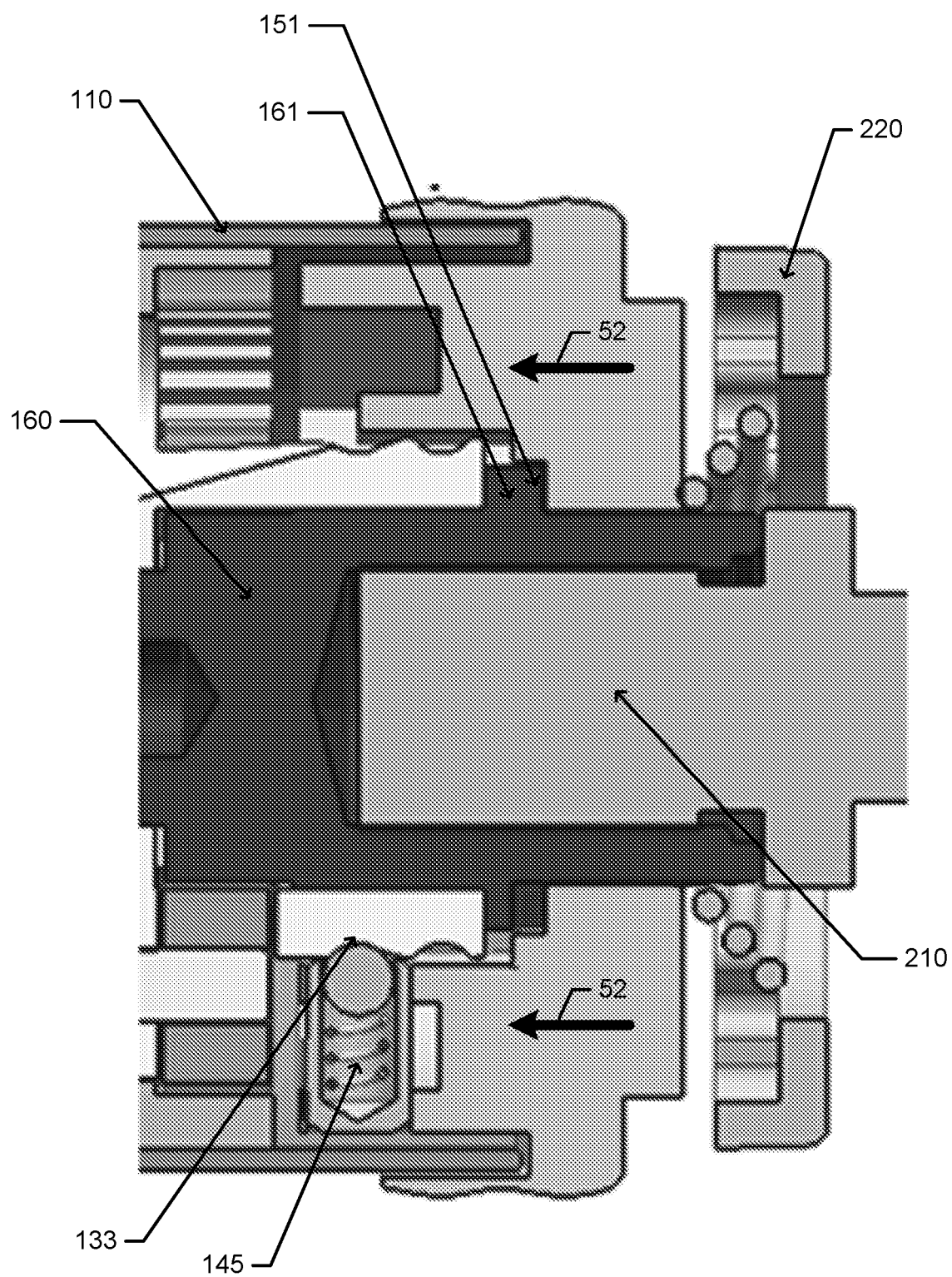
Figure 12:
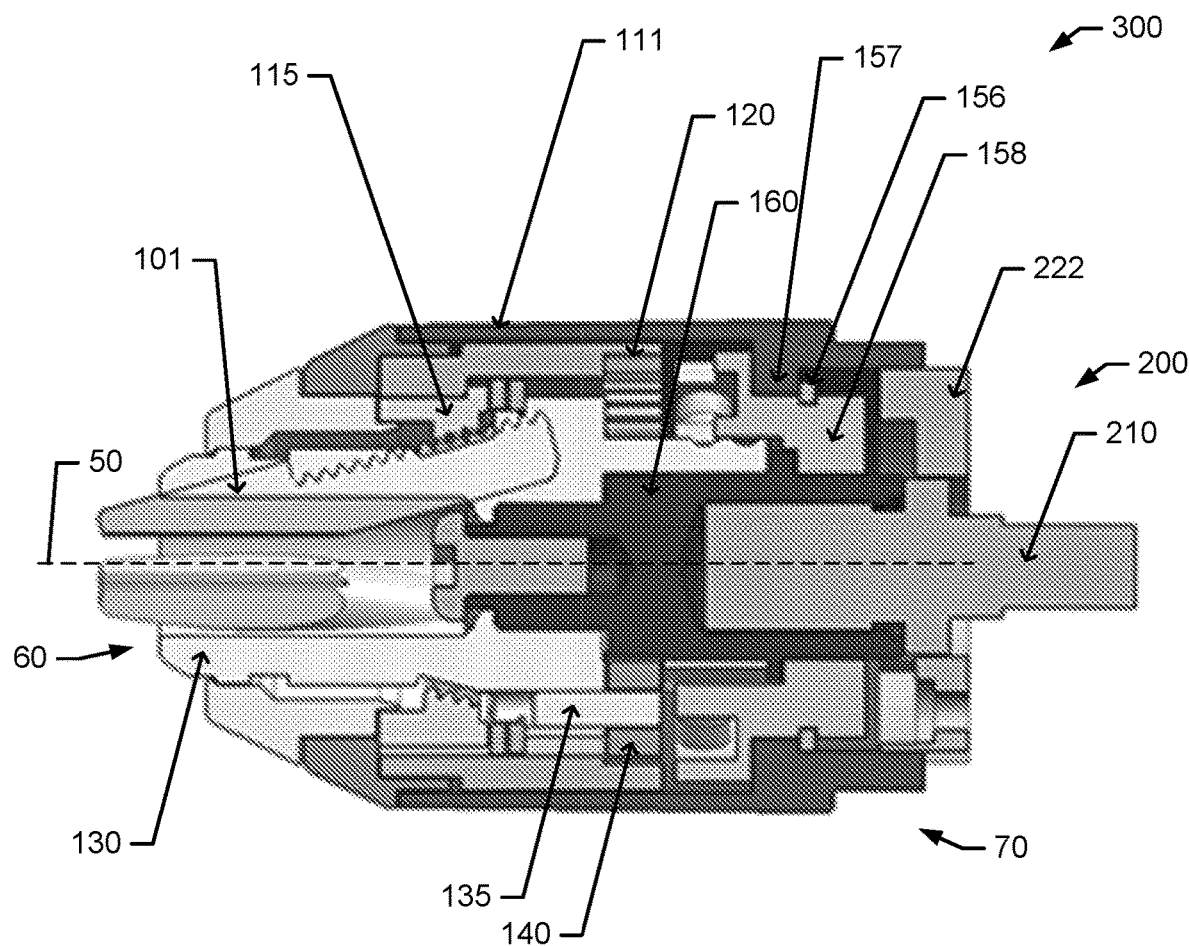
Figure 13:
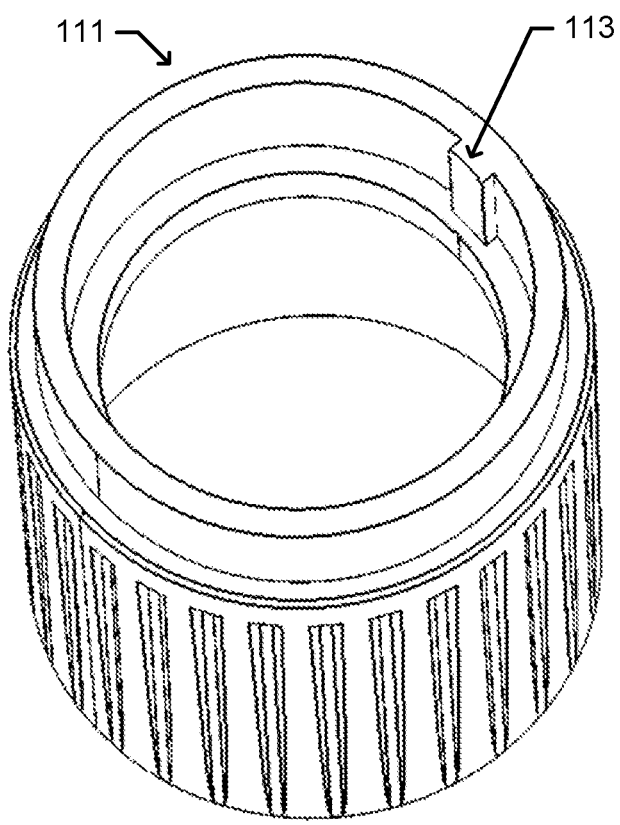
Figure 14:
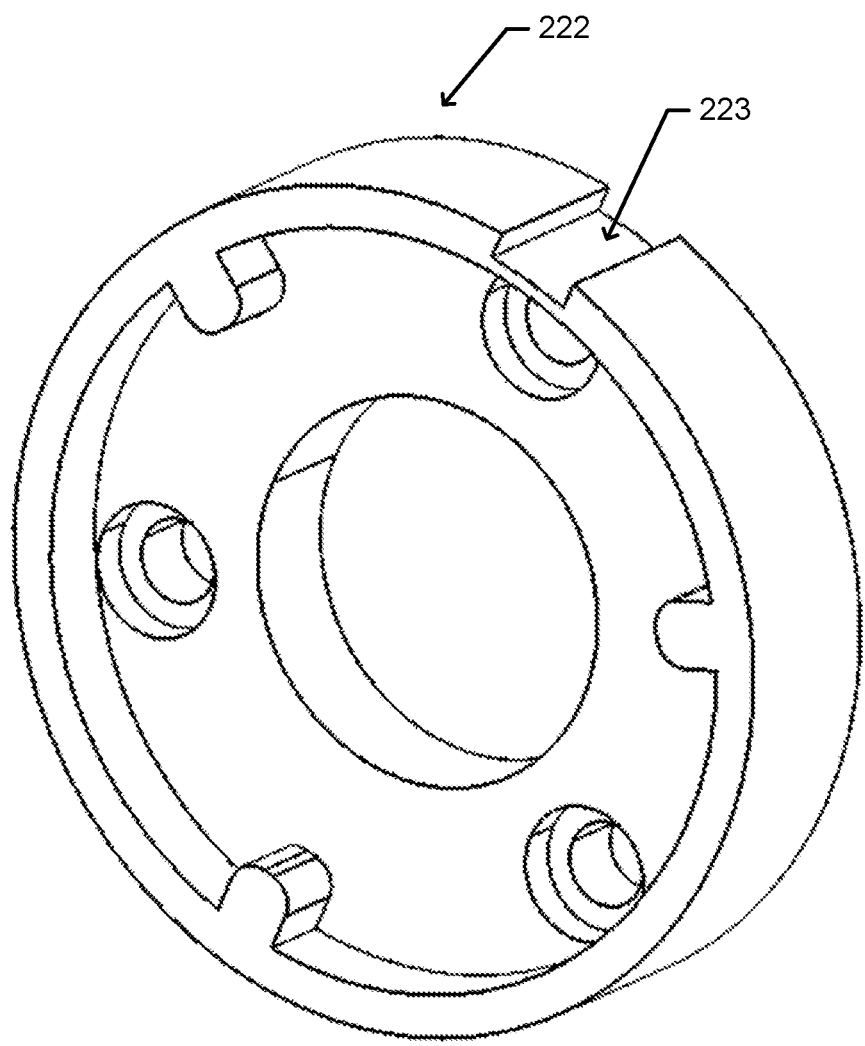
Figure 15:
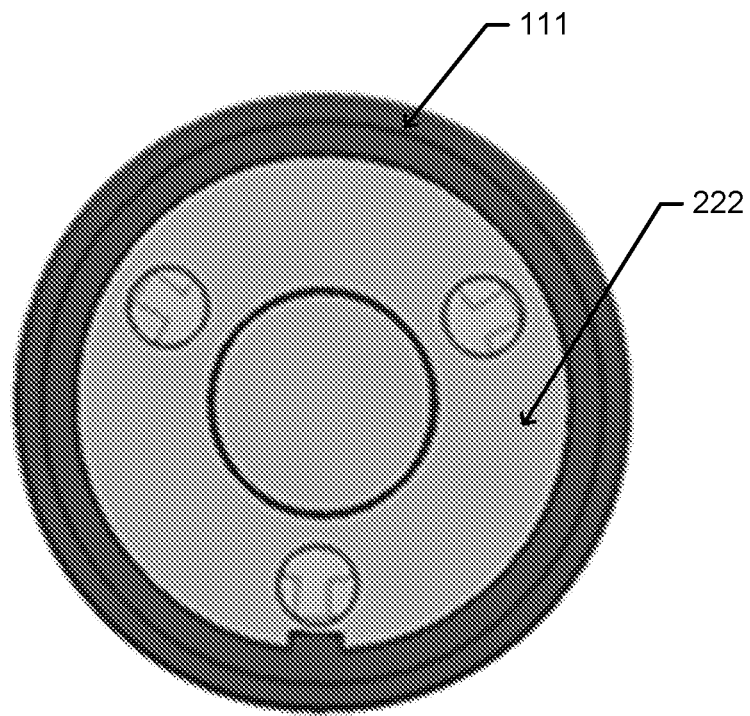
Figure 16:
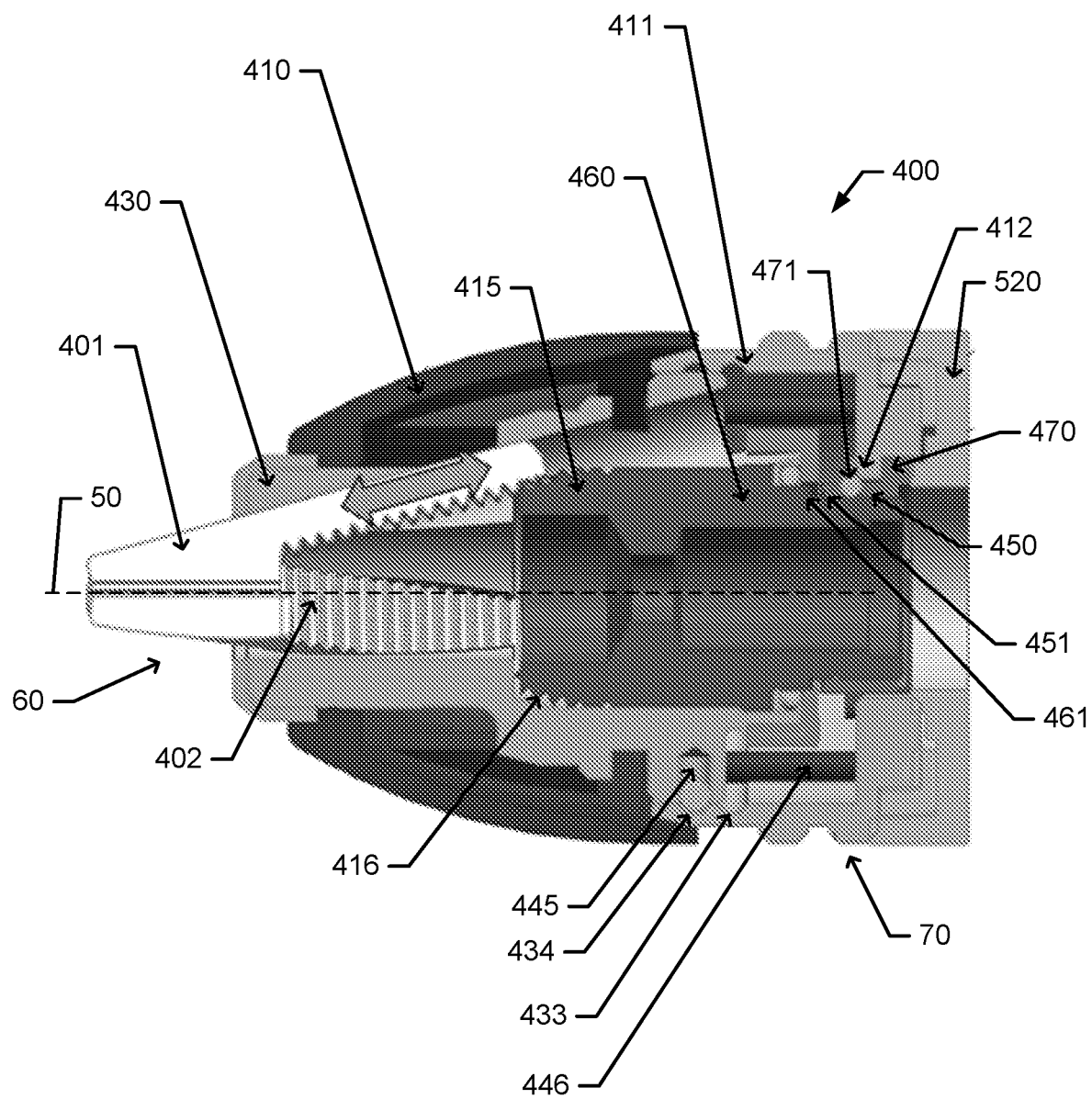
Figure 17:
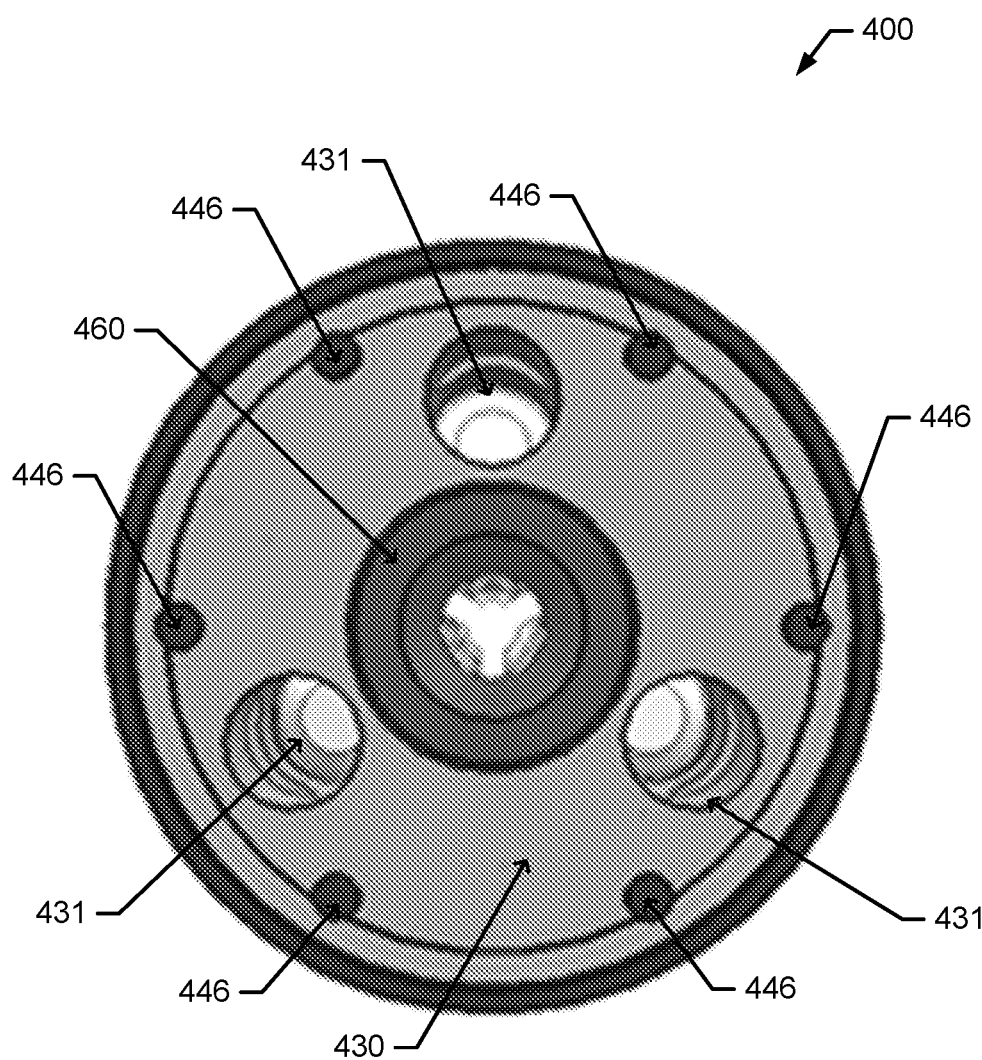
Figure 18:
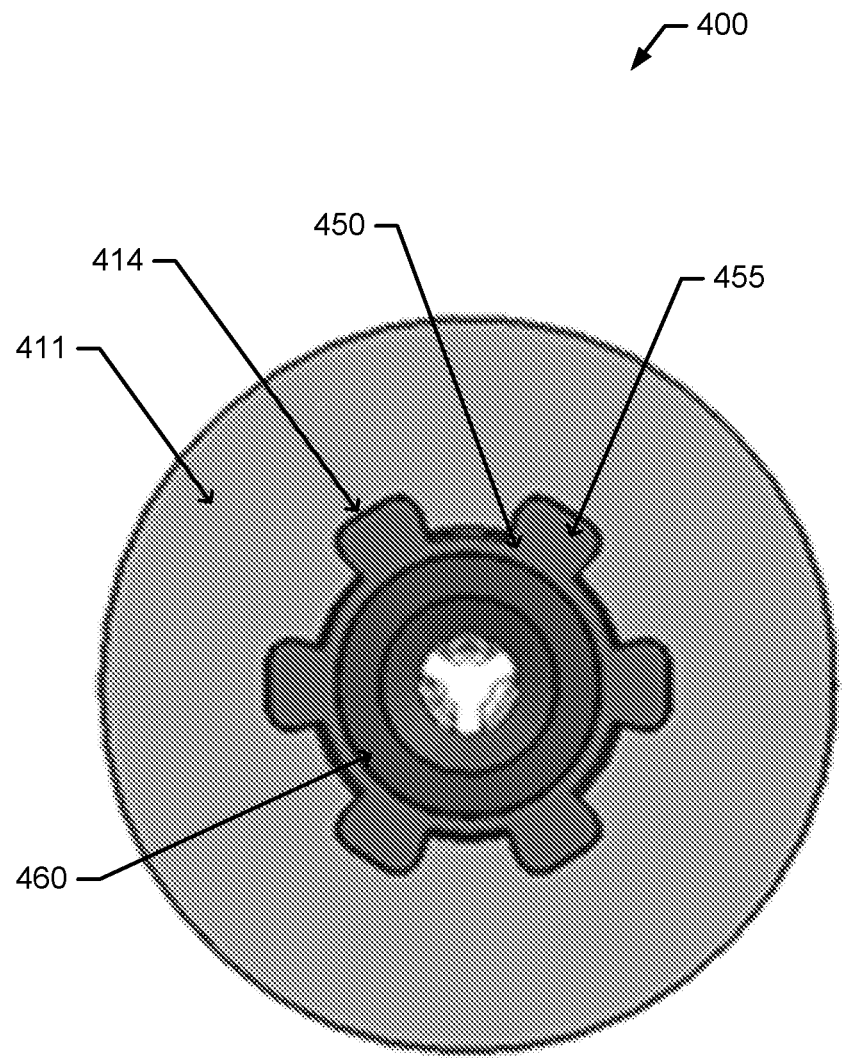
Figure 19:
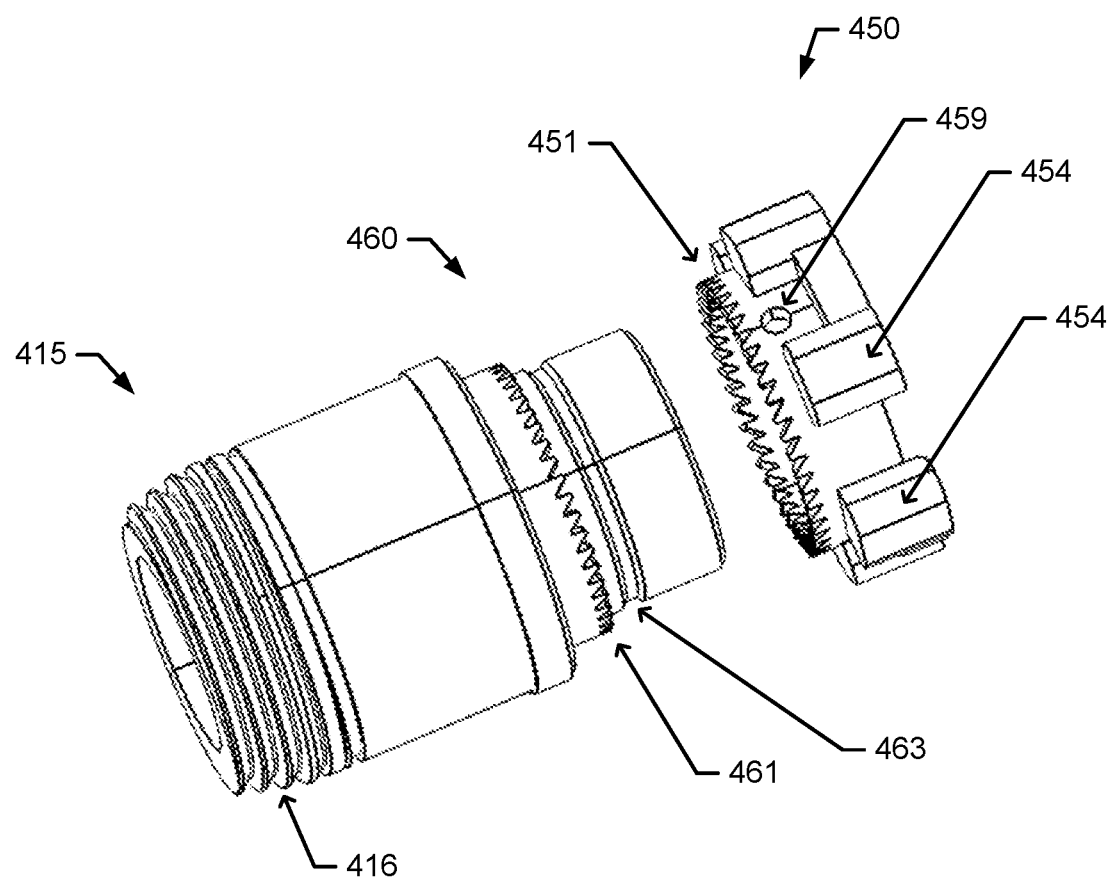
Figure 20:
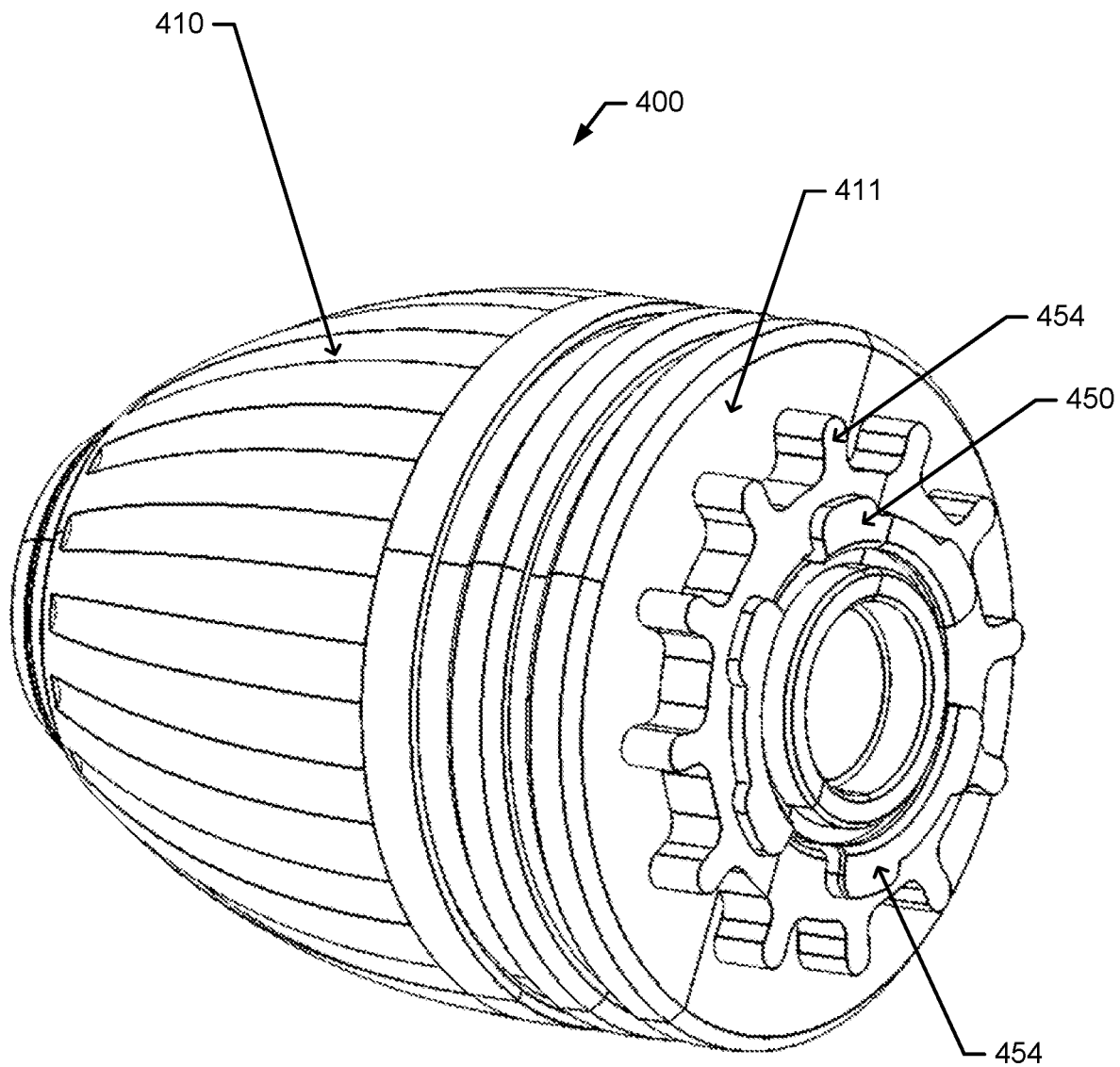
Figure 21:
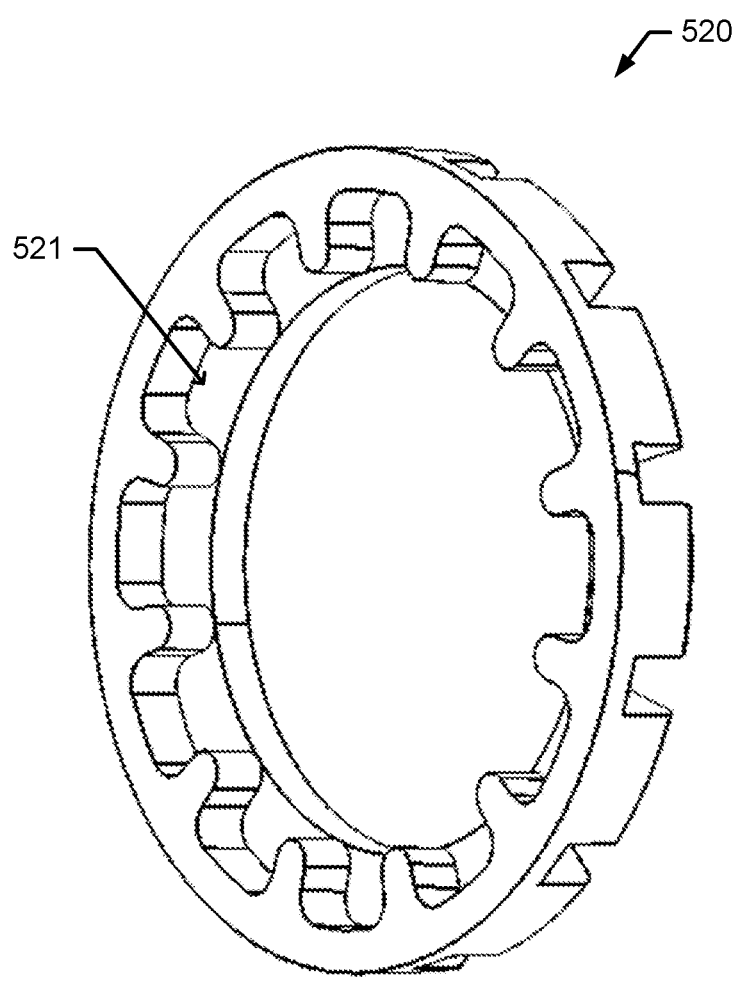
Figure 22:
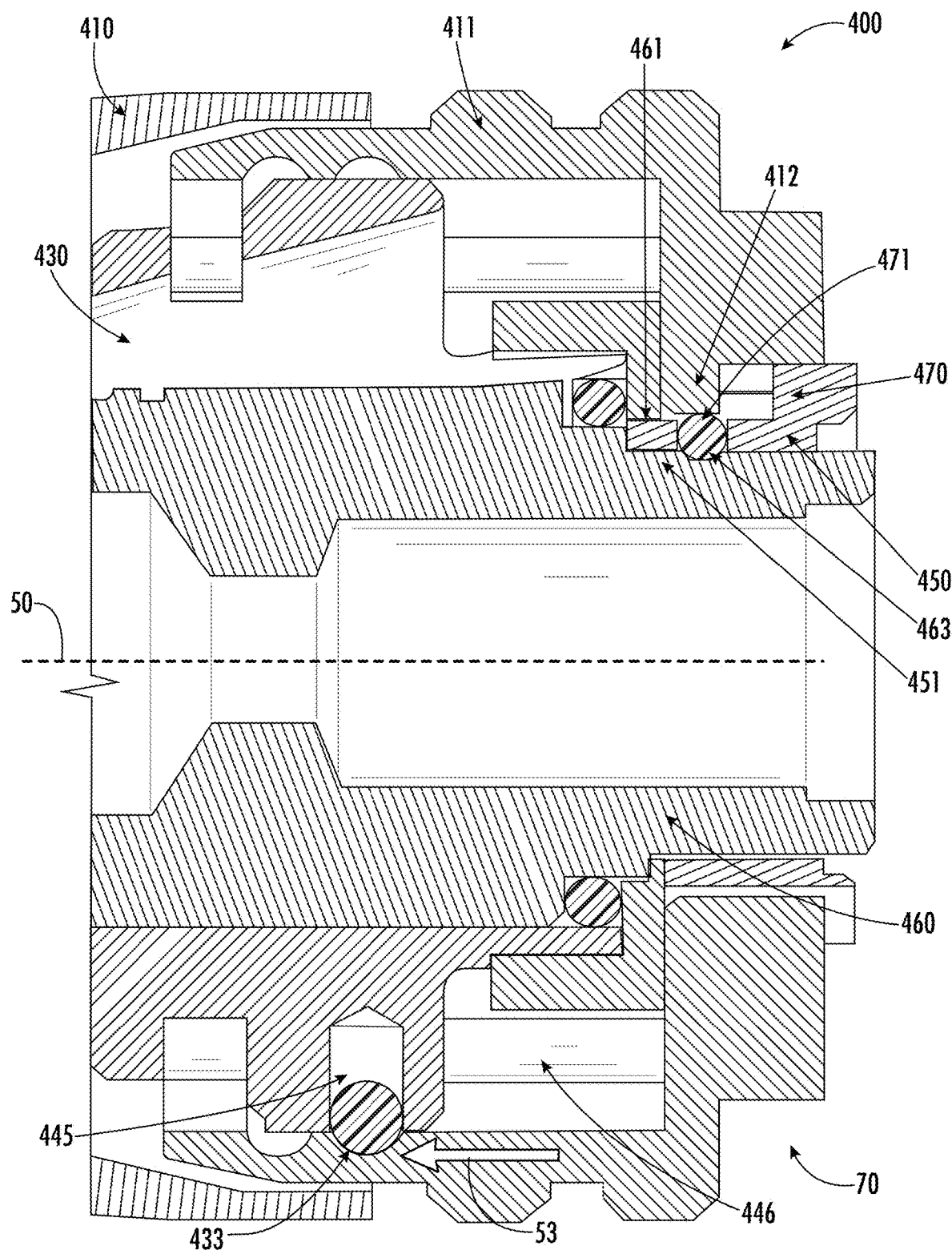
Figure 23:
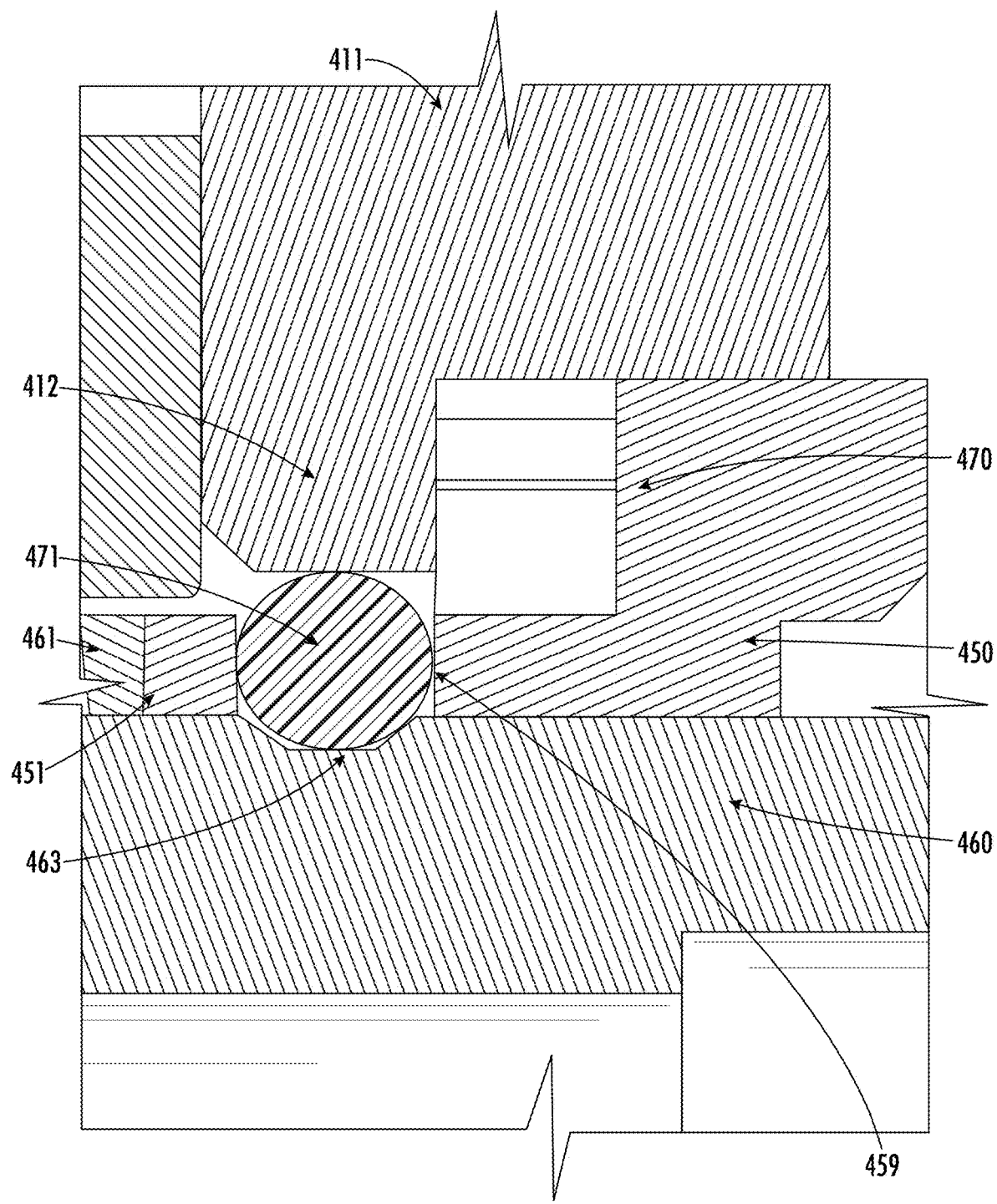
Figure 24:
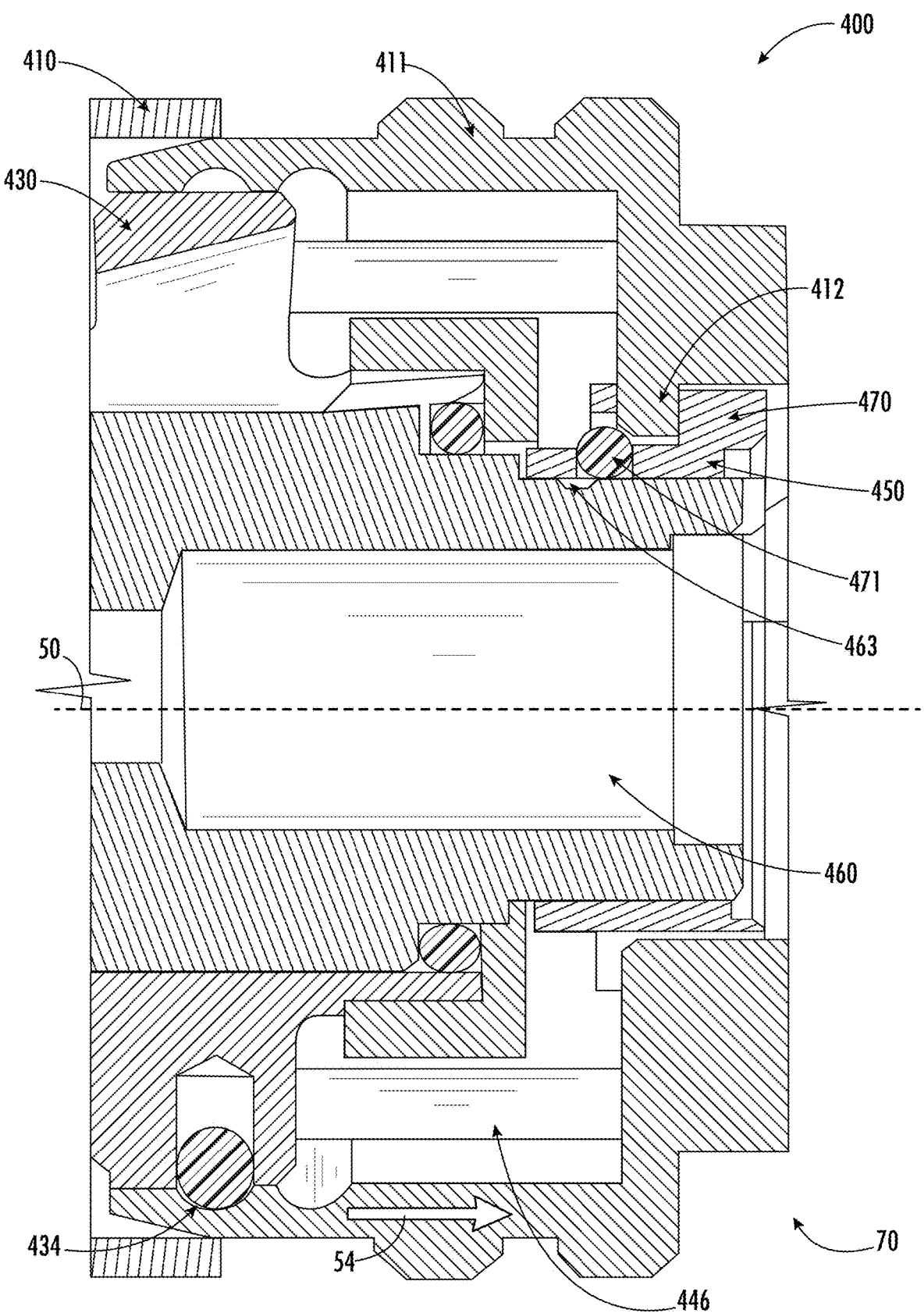
Figure 25:
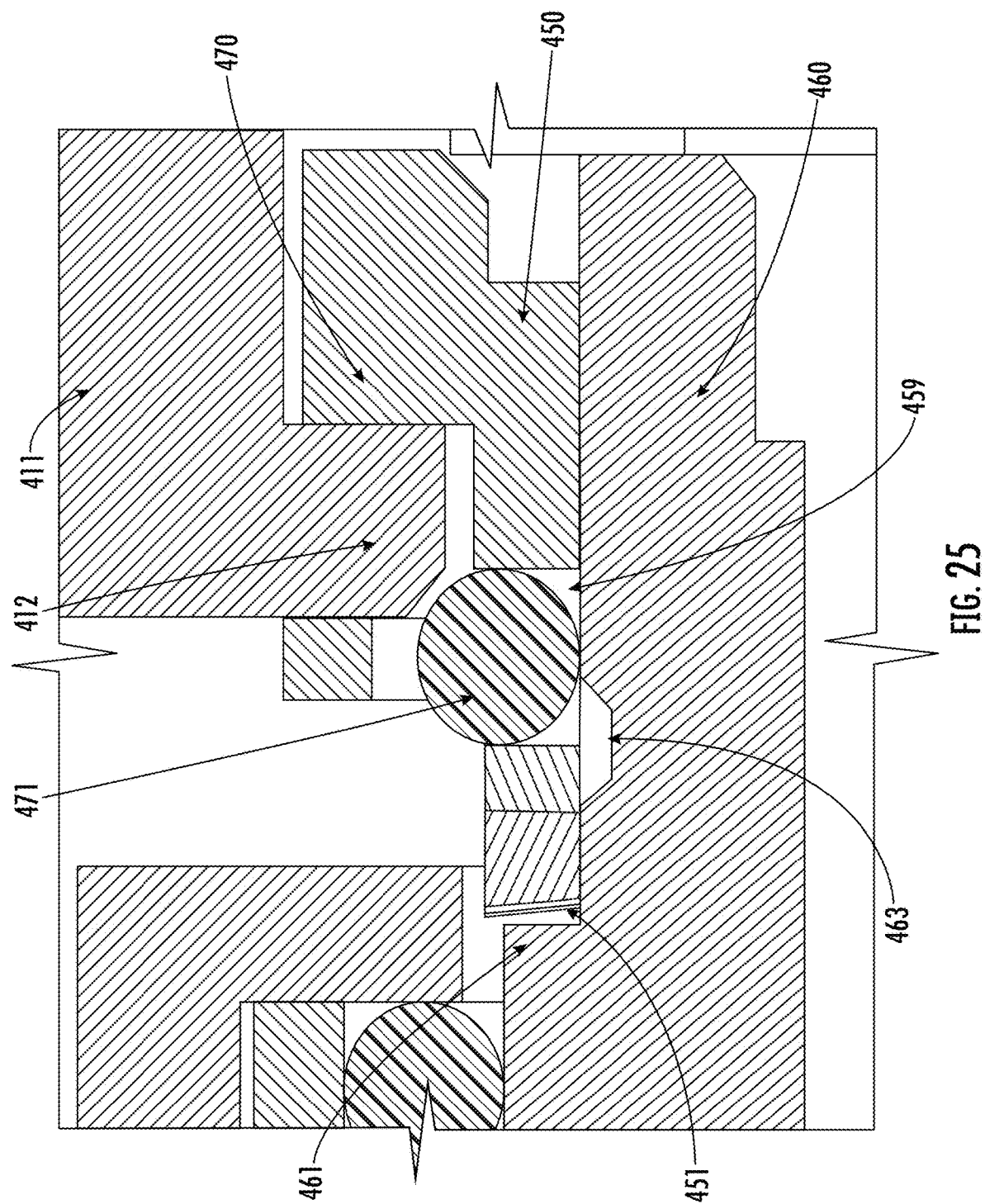
Figure 26:
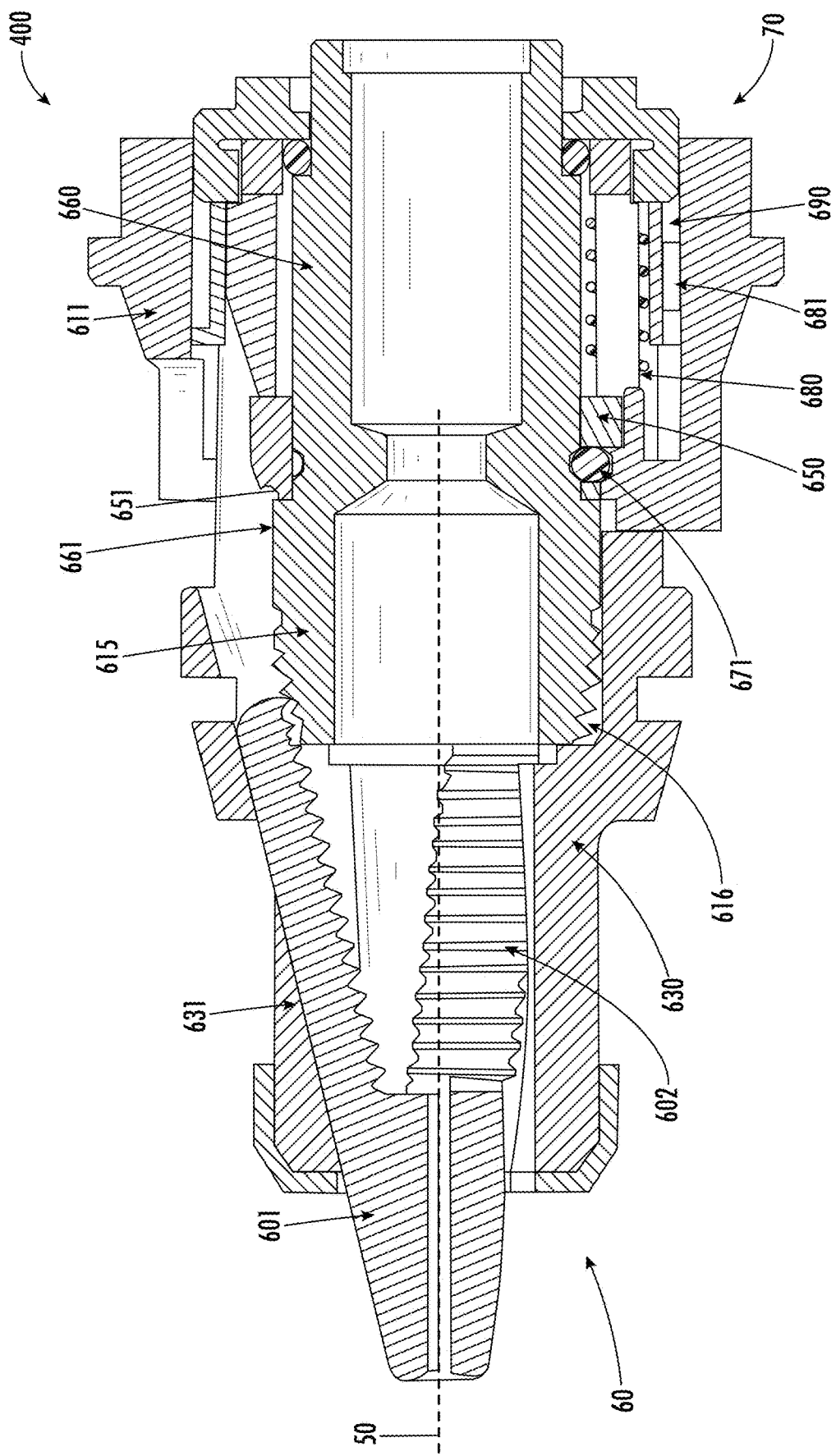
Figure 27:
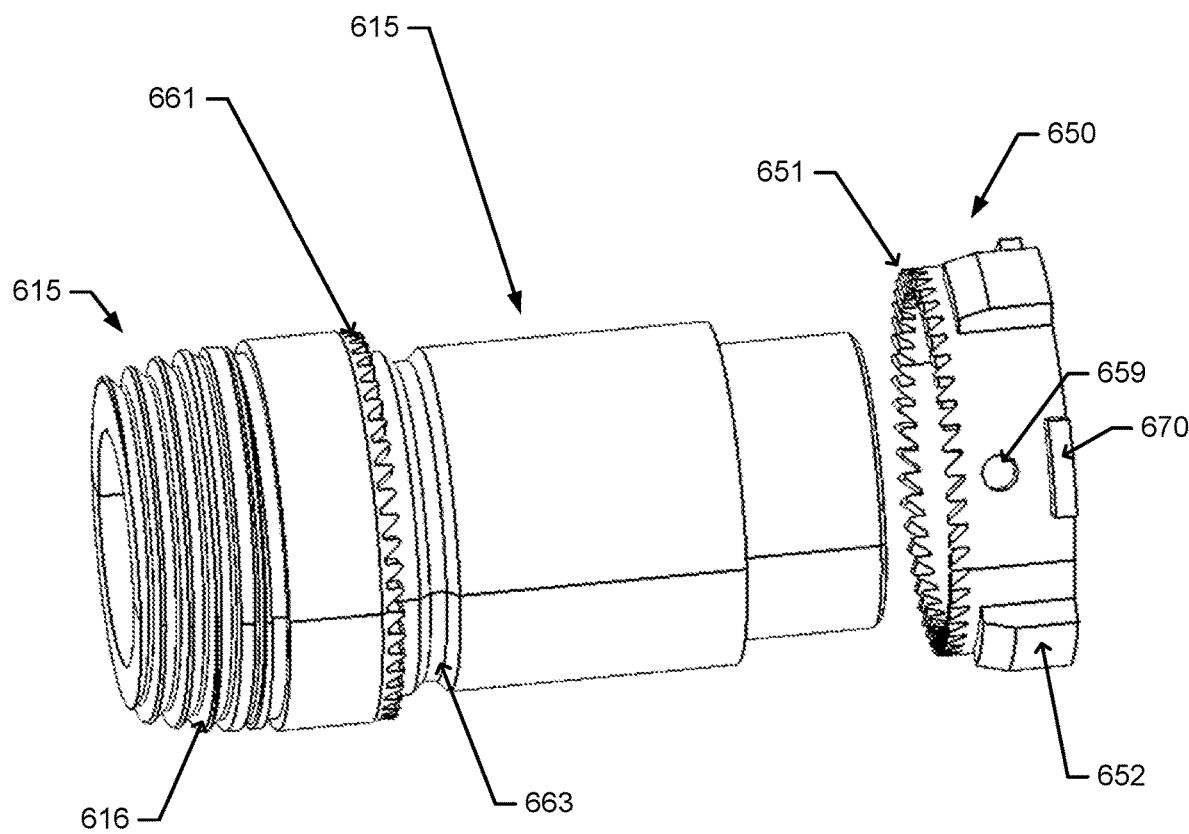
Figure 28:
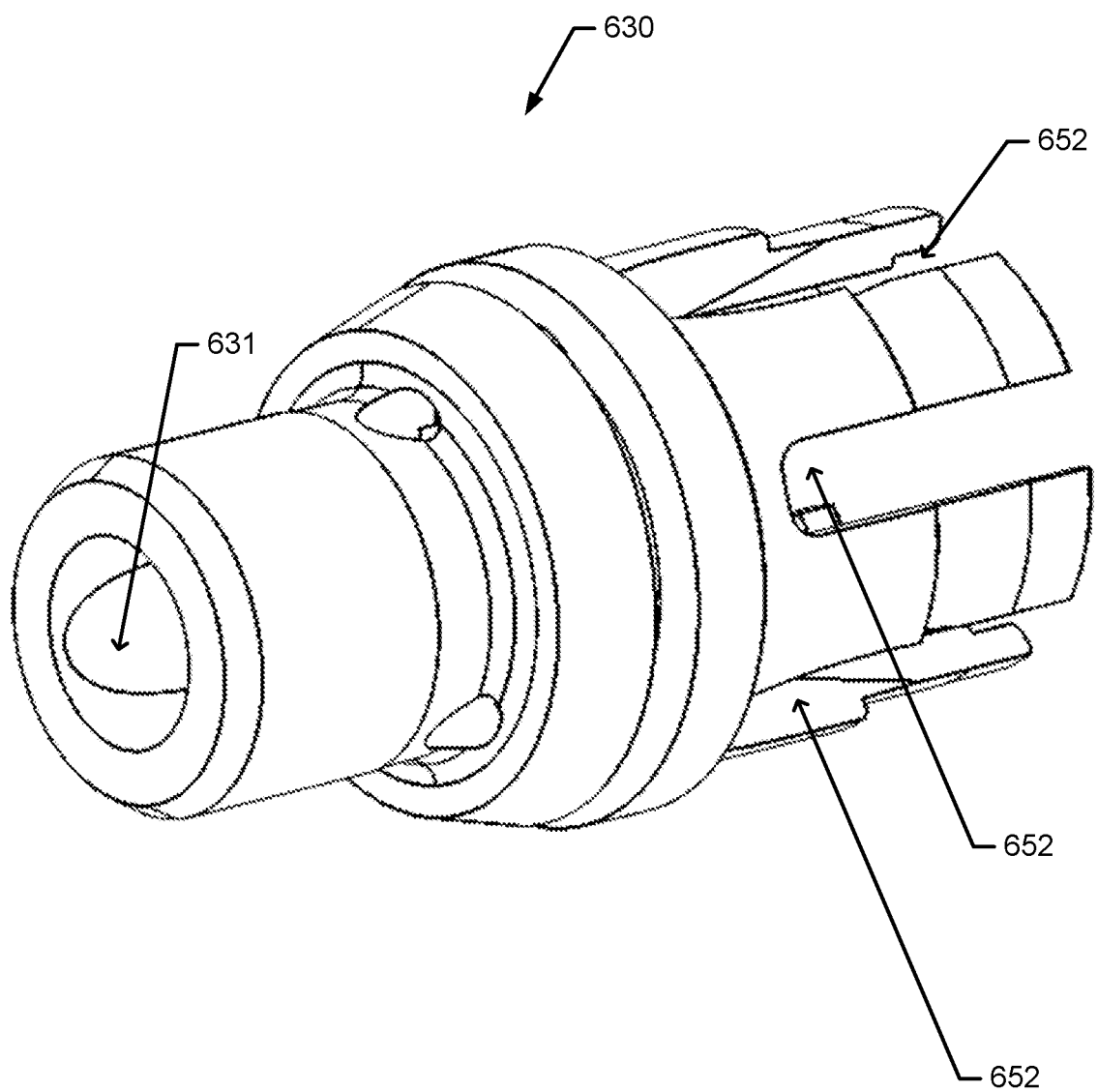
Figure 29:
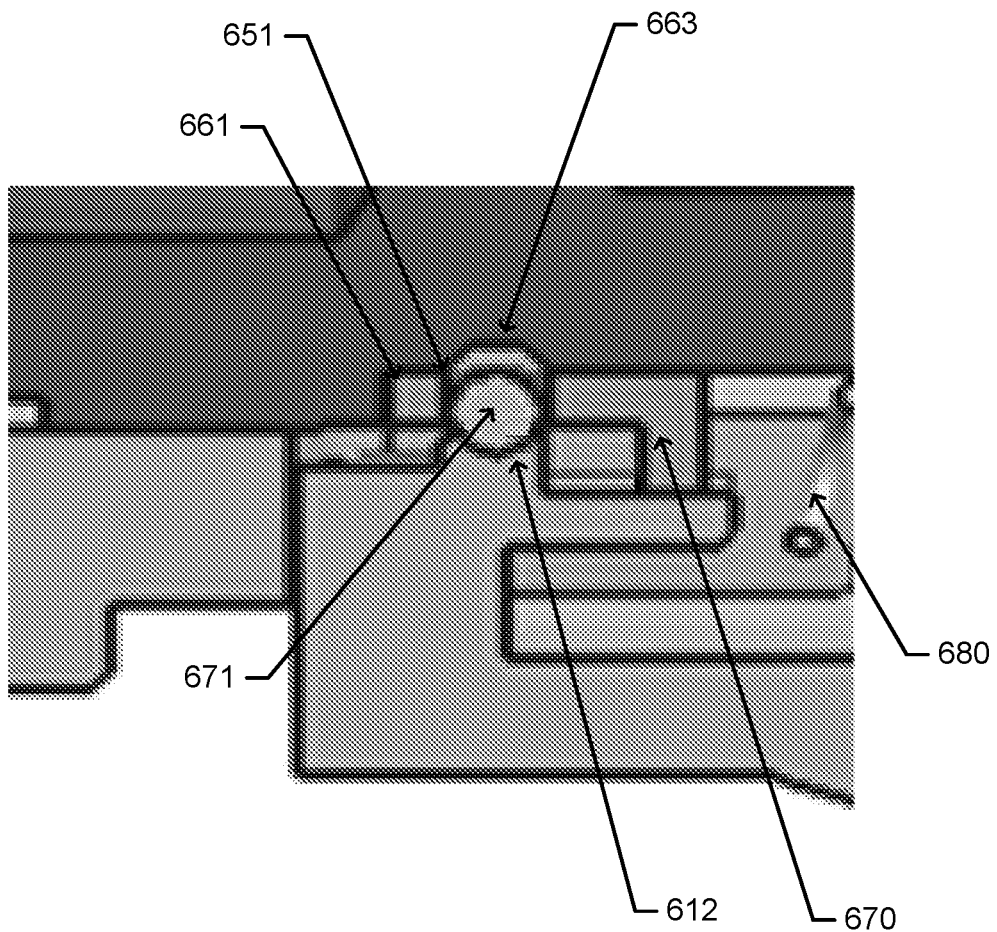
Figure 30:
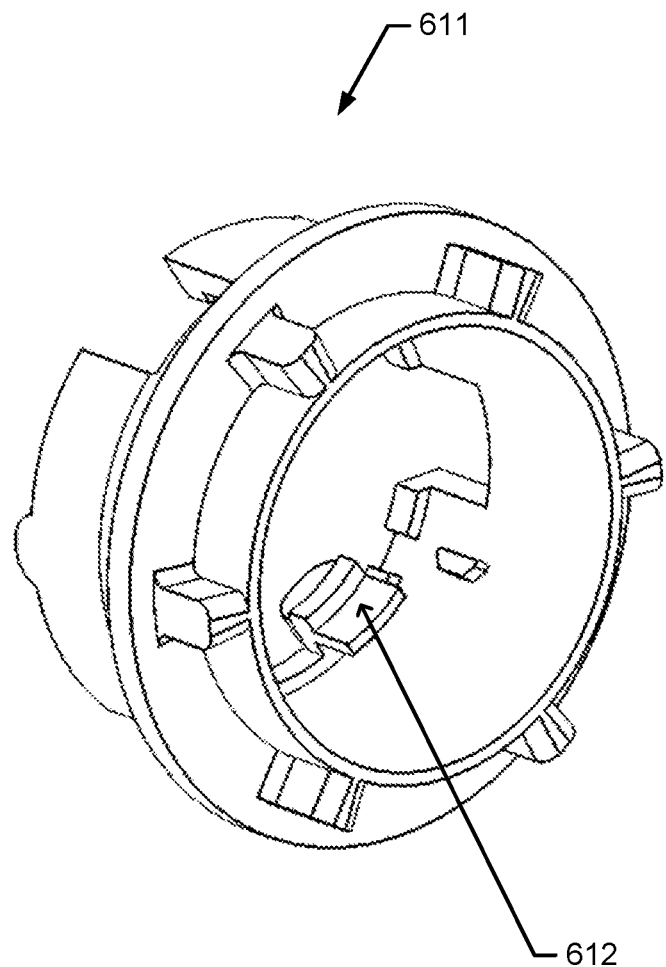
Figure 31:
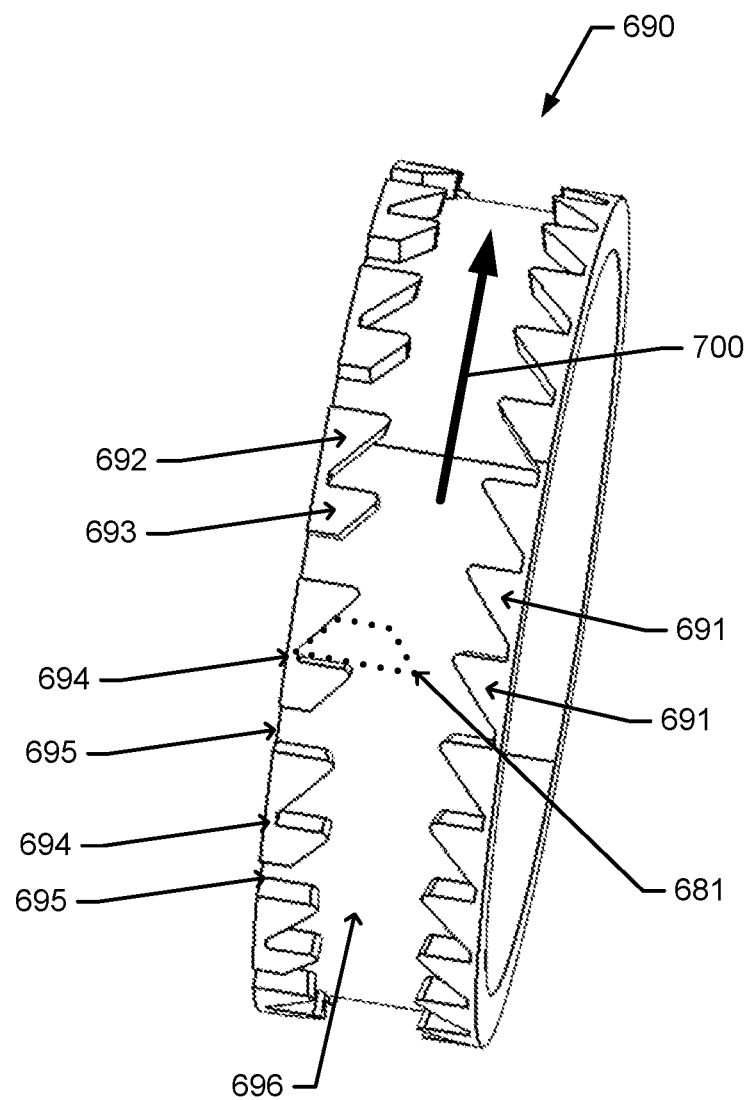
Figure 32:
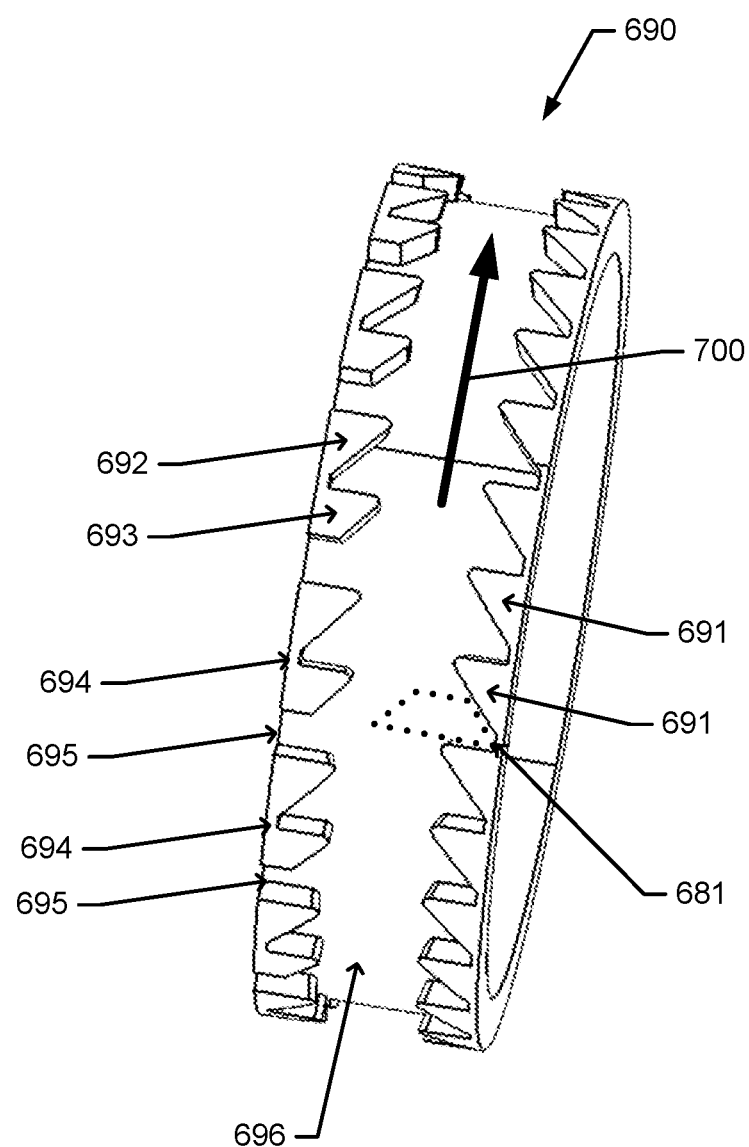
Figure 33:
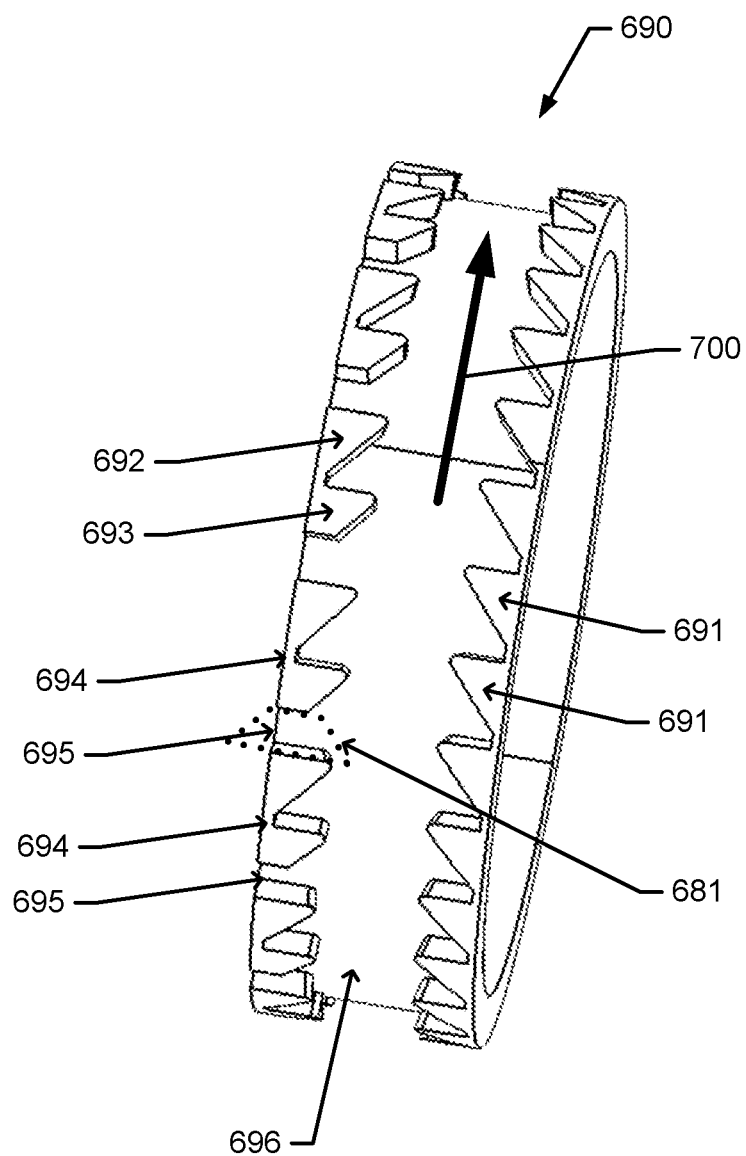

Having thus described some example embodiments in general terms, reference will now be made to the accompanying drawings, which are not necessarily drawn to scale, and wherein:

FIG. 1 illustrates a perspective view of a chuck in accordance with an example embodiment;

FIG. 2 illustrates cross-section side view of a chuck in accordance with an example embodiment;

FIG. 3 illustrates a side view of a front body of the chuck of FIG. 2 in accordance with an example embodiment;

FIG. 4 illustrates a perspective front view of a clutch of the chuck of FIG. 2 in accordance with an example embodiment;

FIG. 5 illustrates a perspective front view of components of the chuck of FIG. 2 including a rear body and a clutch in accordance with an example embodiment;

FIG. 6 illustrates an axial cross-section view of the chuck of FIG. 2 showing spring plunger assemblies in accordance with an example embodiment;

FIG. 7 illustrates an axial cross-section view of the chuck of FIG. 2 showing an engagement between an inner gear, intermediate gears, and a rear body gear in accordance with an example embodiment;

FIG. 8 illustrates a perspective rear view of clutch of the chuck of FIG. 2 in accordance with an example embodiment;

FIG. 9 illustrates a perspective front view of a static member associated with the chuck of FIG. 2 in accordance with an example embodiment;

FIG. 10 illustrates a cross-section side view of a rear portion of the chuck of FIG. 2 in a jaw actuation mode in accordance with an example embodiment;

FIG. 11 illustrates cross-section side view of a rear portion of the chuck of FIG. 2 in a working mode in accordance with an example embodiment;

FIG. 12 illustrates cross-section side view of another chuck in accordance with an example embodiment;

FIG. 13 illustrates a perspective front view of a sleeve of the chuck of FIG. 12 in accordance with an example embodiment;

FIG. 14 illustrates a perspective front view of a static member associated with the chuck of FIG. 12 in accordance with an example embodiment;

FIG. 15 illustrates a cross-section axial view of the chuck of FIG. 12 showing operable coupling between the sleeve and the static member in accordance with an example embodiment;

FIG. 16 illustrates cross-section side view of another chuck in accordance with an example embodiment;

FIG. 17 illustrates an axial cross-section view of the chuck of FIG. 16 showing a front body in accordance with an example embodiment;

FIG. 18 illustrates an axial cross-section view of the chuck of FIG. 16 showing operable coupling between a clutch and a rear sleeve in accordance with an example embodiment;

FIG. 19 illustrates a perspective side view of a rear body, a nut, and a clutch of the chuck of FIG. 16 in accordance with an example embodiment;

FIG. 20 illustrates a perspective rear view of the chuck of FIG. 16 in accordance with an example embodiment;

FIG. 21 illustrates a perspective front view of a static member associated with the chuck of FIG. 16 in accordance with an example embodiment;

FIG. 22 illustrates cross-section side view of a rear portion of the chuck of FIG. 16 in a working mode in accordance with an example embodiment;

FIG. 23 illustrates cross-section, zoomed-in side view of a rear portion of the chuck of FIG. 16 in a working mode in accordance with an example embodiment;

FIG. 24 illustrates cross-section side view of a rear portion of the chuck of FIG. 16 in a jaw actuation mode in accordance with an example embodiment;

FIG. 25 illustrates cross-section, zoomed-in side view of a rear portion of the chuck of FIG. 16 in a jaw actuation mode in accordance with an example embodiment;

FIG. 26 illustrates cross-section side view of another chuck in accordance with an example embodiment;

FIG. 27 illustrates a perspective side view of components of the chuck of FIG. 26 including a rear body and a clutch in accordance with an example embodiment;

FIG. 28 illustrates a perspective front view of a front body of the chuck of FIG. 26 in accordance with an example embodiment;

FIG. 29 illustrates a cross-section, zoomed-in side view of a rear portion of the chuck of FIG. 26 in accordance with an example embodiment;

FIG. 30 illustrates a perspective rear view of a rear sleeve of the chuck of FIG. 26 in accordance with an example embodiment; and FIGS. 31 through 33 illustrate a perspective side view of a lock ring in various configurations with a positioning lug in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As mentioned above, conventional chucks for use with power drivers (e.g., pneumatic or electric drills, power screw drivers, or the like) often employ an external sleeve that rotates with the driver at high velocity. Because the sleeve has a relatively large surface area, this rotating movement of the sleeve can create a risk of damaging a work product by marring the product due to accidental physical interaction with the product. Further, the high velocity spinning of the sleeve may also create a risk of injury if the rotating sleeve were to come into contact with an individual. As such, it would be advantageous to provide a chuck with a sleeve that does not rotate with the jaws of the chuck and the working bit that is engaged in the jaws, thereby allowing a user to hold the sleeve of the chuck during operation of the power driver. The sleeve often rotates with the jaws because the sleeve operates as a component of the assembly that opens and closes the jaws during installation or removal of a working bit. In this regard, during installation and removal of a working bit in a conventional chuck, the jaws and the sleeve rotate relative to each other. As such, once, for example, the working bit is installed, the sleeve and the jaws rotate together during working operation of the driver. The relative rotation of the sleeve to the jaws may be generated by a user holding the sleeve stationary while operating the driver to turn the jaws. Efficiencies and proper tightening of the jaws on a working bit during installation can be realized by using the power driver to create this relative motion. As such, it would be advantageous to utilize the rotation of a drive spindle of the power driver during the opening and closing of the jaws of the chuck. However, a technical problem is designing a chuck that leverages the rotation of the drive spindle to open and close the jaws of the chuck with a sleeve that does not rotate with the jaws when the power driver is in a working mode. Another technical problem is that many conventional chucks cause the jaws to rotate during opening and closing of the jaws when the sleeve is held in place by a user and the driver is used for the relative motion. This movement of the jaws can increase the difficulty of installing and removing a working bit from the jaws. As such, it would be advantageous to provide a chuck that can use the rotation of the power driver to open and close the jaws without rotating the jaws.

According to some of the various example embodiments described herein, a chuck is provided that can operate to address some or all of these stated and other unstated technical problems of many conventional chucks while also realizing some or all of the advantages described herein. According to some example embodiments, a clutch may introduced that operates to transition the chuck between a working mode, e.g., to drive a fastener or drill a hole, and a jaw actuation mode to open and close the jaws. According to some example embodiments, due to the operation of the clutch, when the chuck is in the jaw actuation mode, the jaws may be rotationally stationary but still actuate or move outwards into a closed position or inwards into an open position while leveraging the rotation of the driver spindle to drive the movement of the jaws. Conversely, when the clutch causes the chuck to be in the working mode, the jaws may be configured to rotate with driver spindle to drive the working bit. According to some example embodiments, in either of the working or jaw actuation mode, a sleeve of the chuck may be disengaged from any rotating members of the chuck and free to rotate relative to any rotating members thereby recognizing some of the safety and damage avoidance benefits described above.

FIG. 1 illustrates and example chuck 10 according to some example embodiments. In this regard, in FIG. 1 the chuck 10 is shown as being physically coupled to a portion of a power driver 20, which may be, for example, a pneumatic or electric powered tool (e.g., a drill) configured to rotate a drive spindle that is operably coupled to the chuck 10. As seen in FIG. 1, the chuck 10 may be comprise, among other components, jaws 11, a nose 12, and a sleeve 13. The power driver housing 21 may be a component of the power driver 20. The chuck 10 may also define a center axis or an center axis 50.

FIG. 2 illustrates an example chuck 100 according to some example embodiments. FIG. 2 is a side cross-section view of the chuck 100 and some components of a power driver 200, which may be the same or similar to the power driver 20. For orientation purposes, the clutch 100 may have a forward end 60 and a rearward end 70. As mentioned above, the chuck 100 may include a clutch 150 that is operable to transition the chuck 100 between a working mode and a jaw actuation mode. As such, the clutch 150 may be movable into a working position to cause the chuck 100 to be in the working mode, and the clutch 150 may be movable into a jaw actuating position to cause the chuck 100 to be in the jaw actuation mode. In the working mode, the chuck 100 may be configured to drive a working bit (not shown) installed in the jaws 101 of the chuck 100 to, for example, turn a fastener, drill a hole, or the like. In the jaw actuation mode, the chuck 100 may be configured to cause the jaws 101 to open or close to allow for removal or installation of a working bit. To transition the chuck 100 between the working mode and the jaw actuation mode, the clutch 150 may be moveable along the center axis 50 (i.e., the axis of rotation) to couple a rear body 160 to, or decouple the rear body 160 from, a front body 130.

With reference to FIGS. 2 and 3, the front body 130 may operably couple with the jaws 101 via jaw passageways 131 in the front body 130. In this regard, a plurality of jaws 101 may be configured to move, slide, or actuate into an out of jaw passageways 131. According to some example embodiments, the chuck 100 may include three jaws 101 and the front body 130 may include three associated jaw passageways 131. The jaw passageways 131 may operate to permit the jaws 101 to move rearward into the front body 130 (i.e., in a jaw opening direction) and forward out of the front body 130 (i.e., in a jaw closing direction). In this regard, as the jaws 101 move forward within the passageways 131 in the jaw closing direction, the jaws 101 may move along a respective angle relative to the center axis 50 such that the jaws 101 meet at a point on the center axis 50 forward of the front body 130. Similarly, as the jaws 101 move rearward within the passageways 131 in the jaw opening direction, the jaws 101 may move along the respective angles relative to the center axis 50 such that the jaws 101 move away from that point on the center axis 50 forward of the front body 130. Accordingly, the jaws 101 may move relative to the front body 130 in the jaw passageway 131, but the jaws 101 may be operably coupled to the front body 130 such that the jaws 101 rotate with the front body 130, regardless of whether the chuck 100 is in the working mode or in the jaw actuation mode.

The jaws 101 may include jaw teeth 102 that operably couple to a nut 115 and, more specifically, a nut thread 116 to move the jaws 101. As described herein the nut is described as being threaded to create screw action between the nut and jaws, however, one of skill in the art would appreciate that the thread may alternatively or additionally be included on the jaws and the use of the term teeth may encompass threaded teeth. According to some example embodiments, the jaws 101 may have the jaw teeth 102 disposed on an external surface of the of the jaws 101 and facing outward from the center axis 50. As such, the nut 115 may be disposed external to the jaws 101 (i.e., further from the center axis 50) and the nut thread 116 may be facing inwards to operably couple with the outward facing jaw teeth 102. As further described herein, the nut 115 may rotate relative to the jaws 101, when the chuck 100 is in a jaw actuation mode, to cause the jaws 101 to move relative to the front body 130 forward and together or rearward and apart through screw action between the nut thread 616 and jaw teeth 602. Additionally, when the chuck 100 is in the working mode, the nut 115 may rotate with the jaws 101 and therefore no relative movement occurs to cause the jaws 101 to move in the opening or closing directions.

A rear body 160 of the chuck 100 may be an elongate, substantially cylindrical member (as best seen in FIG. 5) that operably couples a drive spindle 210 of the power driver 200 to the chuck 100. In this regard, the rear body 160 may include a bore that is configured to receive and secure the drive spindle 210 to the rear body 160. In this regard, the rear body 160 may be configured to rotate with the drive spindle 210, regardless of whether the chuck 100 is in the working mode or the jaw actuation mode. As further described herein, the rear body 160 may also include rear body teeth 161 disposed about an outer circumferential wall of the rear body 160 and oriented in a rearward direction. Additionally, the rear body 160 may include a rear body gear 162 that is also disposed about an outer circumferential wall of the rear body 160 and having teeth that are oriented outward from the center axis 50.

With reference to FIGS. 2 through 5, the clutch 150 may operate to couple and decouple the front body 130 to the rear body 160 to transition the chuck 100 between the working mode and jaw actuation mode. As shown in FIG. 4, the clutch 150 may include features that operably couple the clutch 150 to both the front body 130 and the rear body 160. With respect to the front body 130, the clutch 150 may include protrusions 153 disposed on an inner wall of the clutch 150 that operably couple with channels 132 of the front body 130. In this regard, the protrusions 153 may slideably couple with the channels 132 to permit the clutch 150 to move axially (i.e., move parallel to the center axis 50) relative to the front body 130. The protrusions 153 may also operate to cause the front body 130 to rotate with the clutch 150. In this regard, according to some example embodiments, regardless of whether the chuck 100 is in the working mode or the jaw actuation mode, the protrusions 153 may remain within the channels 132 and therefore the front body 130 may rotate when the clutch 150 rotates and remain rotationally stationary when the clutch 150 is rotationally stationary.

When the clutch moves between the working position and the jaw actuating position, the clutch 150 may move relative to the front body 130. In the working position, the clutch 150 may be moved in a forward direction along the center axis 50 (i.e., parallel to the center axis) relative to the front body 130. In the jaw actuating position, the clutch 150 may be moved in a rearward direction along the center axis 50 relative to the front body 130. In this regard, as best seen in FIG. 3, the front body 130 may include a working position depression 133 and, rearward of the working position depression, a jaw actuating position depression 134. The clutch 150 may be configured to receive one or more spring plunger assemblies 145 that operably couple with either the working position depression 133 or the jaw actuating position depression 134. As seen best in FIG. 6, the spring plunger assembly 145 may comprise a ball 146 and a spring 147. According to some example embodiments, a plurality of spring plunger assemblies (e.g., three) may be disposed in association with respect receiving cavities of the clutch 150. The spring plunger assembly 145 may operate with the working position depression 133 and a jaw actuating position depression 134 to lock or maintain the clutch 150 in with the working position or the jaw actuating position. In this regard, the spring plunger assembly 145 may be disposed within the opening 152 of the clutch 150 such that the spring biased ball 146 extends into an inner cavity of the clutch 150. The clutch 150 may operably couple to the front body 130 at a rear end of the front body 130 such that the protrusions 153 operably couple with the channels 132 and the spring plunger assembly 145 operably couples with either of the working position depression 133 or the jaw actuating position depression 134, depending on the position of the clutch 150. Accordingly, when the clutch 150 is in the working position, the spring plunger assembly 145 may be operably coupled with the working position depression 133, and when the clutch 150 is in the jaw actuating position the spring plunger assembly 145 may be operably coupled with the jaw actuating position depression 134.

With respect to the interface between the clutch 150 and the rear body 160, the clutch 150 may also move axially between the working position and jaw actuating position relative to the rear body 160. Movement of the clutch 150 between the working position and the jaw actuating position may operate to couple and decouple the clutch teeth 151 with the rear body teeth 161, respectively. In this regard, the clutch 150 may include clutch teeth 151 that face forward to operably couple with the rearward facing rear body teeth 161. As such, when the clutch 150 is in the working position, the clutch teeth 151 may be operably coupled with the rear body teeth 161, and therefore the clutch 150 may rotate with the rear body 160. In contrast, when the clutch 150 is in the jaw actuating position, the clutch teeth 151 may be decoupled from (i.e., not in physical contact with) the rear body teeth 161, and therefore the rear body 160 may be free to rotate relative to the clutch 150. In other words, when the clutch 150 is in the jaw actuating position, the clutch 150 may be decoupled from the rear body 160 and the rear body 160 is free to rotate relative to the clutch 150.

According to some example embodiments, when the clutch 150 moves rearward into the jaw actuating position, the clutch 150 may move into operable coupling with a static member 220. The static member 220 may be configured to remain rotationally stationary relative to, for example, the drive spindle 210. Therefore, when the clutch 150 moves into operable coupling with the static member 220, the clutch 150 may also be held rotationally stationary. In this regard, according to some example embodiments, the static member 220 may be affixed to or integrated into a housing portion of the power driver 200. According to some example embodiments, the static member 220 may be an adapter (e.g., an adapter plate) that is, for example, adhered to, or otherwise installed on, a housing portion of the power driver 200. As shown in FIG. 9, the static member 220 may include recesses 221 that are configured to operably couple to static member engagement teeth 154 of the clutch 150 (FIG. 8). In this regard, when the clutch 150 is moved rearward into the jaw actuating position, the operable coupling between the static member engagement teeth 154 of the clutch 150 and the recesses 221 may prevent the clutch 150 from rotating and the clutch 150 may be held rotationally stationary relative to the drive spindle 210. According to some example embodiments, a static member spring 195 may be disposed between the static member 220 and the clutch 150. The static member spring 195 may be configured to provide a forward urging force to move the clutch 150 from the jaw actuating position to the working position.

Further, when the clutch 150 is in the jaw actuating position, the clutch 150, and the front body 130, may be decoupled from and not rotate with the rear body 160. As such, due to rotation of the drive spindle 210, the rear body 160 may rotate relative to the front body 130 because the clutch 150 decouples the front body 130 from the rear body 160 when the clutch 150 is in the jaw actuating position. Rotation of the rear body 160 relative to the front body 130 may cause the jaws 101 to move relative to the front body 130. Due to the front body 130 being stationary, the jaws 101 move in the opening or closing direction without rotating (i.e., the jaws 101 are rotationally stationary while moving in the opening or closing directions). In this regard, nut 115, which may rotate relative to the front body 130 to cause the jaws 101 to move, may be affixed to an inner gear 120 as shown in FIG. 2. The inner gear 120 may be disposed on an inner surface of a member that links the inner gear 120 to the nut 115. The inner gear 120 may be operably coupled to one or more intermediate gears 140, each of which may rotate about a respective pin 135. According to some example embodiments, the intermediate gears 140 may be relatively smaller gears (e.g., relative to the inner gear 120 and the rear body gear 161) that operate to rotationally link the inner gear 120 to the rear body gear 161. The intermediate gears 140 may, in turn, be operably coupled to the rear body gear 161, which rotates about the center axis 50 with the rear body 160 and the drive spindle 210. As such, the rotational engagement of the rear body gear 161 to the intermediate gears 140, the intermediate gears 140 to the inner gear 120 which is affixed to the nut 115, may operate to cause the jaws 101 to move into or out of the front body 130 which is held in a static rotational position due to engagement of the clutch 150 with the static member 220 when the clutch 150 is in the jaw actuating position.

With the components of the chuck 100 described, FIGS. 10 and 11 show the configuration of some of the components of the chuck 100 when the clutch 150 is in the jaw actuating position, i.e., FIG. 10, and when the clutch 150 is in the working position, i.e., FIG. 11. In this regard, FIG. 10 shows the clutch 150 in the jaw actuating position and the chuck 100 in the jaw actuation mode. A user has acted upon the clutch 150 to move the clutch 150 in the rearward direction as indicated by arrows 51 and into the jaw actuating position. As such, the spring plunger assembly 145 housed within the clutch 150 has operably coupled with the jaw actuating position recess 134 of the front body 130 thereby maintaining the clutch 150 in the jaw actuating position. The clutch 150 is also operably coupled to the static member 220 to prevent rotation of the clutch 150 and the front body 130 when the drive spindle 210 is rotated. Additionally, the clutch teeth 151 are decoupled from the rear body teeth 161 and therefor the rear body 160 is free to rotate relative to the clutch 150 and the front body 130. Due to the decoupling of the rear body 160 from the front body 130, rear body gear 161 may rotate relative to the front body 130 thereby rotating the intermediate gears 140 and the inner gear 120, which turns the nut 115 to cause the jaws 101 to move in the opening or closing direction based the direction drive spindle 210 is rotating. Further, during motion of the jaws 101 in the closing or opening direction, the jaws 101 do not rotate because the front body 130 is held rotationally stationary by the clutch 150 and the static member 220. Notably, the sleeve 110 is not operably coupled to any rotating component and therefore no rotational force is applied to the sleeve 110 (other than a frictional force due to minimal coupling with another component of the chuck 100) and the sleeve 110 is free to rotate relative to the other components of the chuck 100 while the chuck 100 is in the jaw actuation mode.

In FIG. 11, the clutch 150 has been moved forward into the working position and the chuck 100 is in the working mode. In this regard, a user has acted upon the clutch 150 to move the clutch 150 in the forward direction as indicated by arrows 52 and into the working position. As such, the spring plunger assembly 145 housed within the clutch 150 has operably coupled with the working position recess 133 of the front body 130 thereby maintaining the clutch 150 in the working position. The clutch 150 is decoupled from the static member 220 and therefore the clutch 150 and the front body 130 are free to rotate relative to the static member 220. Further, the clutch teeth 151 are operably coupled to rear body teeth 161 and therefor the clutch 150 rotates with the rear body 160. Since the clutch 150 is operably coupled to the front body 130, the front body 130 therefore rotates with the rear body 160, thereby also rotating the jaws 101 and a working bit that may be installed in the jaws 101. Accordingly, there is no relative rotational movement between the nut 115 and the jaws 101 and therefore the jaws 101 do not move in the opening or closing direction. As such, rotation of the drive spindle 210 operates to rotate rear body 160 and the front body 130 about the center axis 50 in unison. Notably, the sleeve 110 is not operably coupled to any rotating component and therefore no rotational force is applied to the sleeve 110 (other than a frictional force due to minimal coupling with another component of the chuck 100) and the sleeve 110 is free to rotate relative to the other components of the chuck 100 while the chuck 100 is in the working mode.

Referring now to FIG. 12, another example chuck 300 is provided. The chuck 300 is constructed similar to the chuck 100. However, according to some example embodiments, a sleeve 111 of chuck 300 may be modified to operably couple with a modified clutch 158. In this regard, the sleeve 111 may be configured to rotate relative to the clutch 158, but may also be configured to move or translate along the center axis 50 with the clutch 158. As such, the sleeve 111 may move with the clutch 158 between the working position and the jaw actuating position.

A snap ring 156 may be installed about the clutch 158, as seen in FIG. 12, and the sleeve 111 may include a catch 157 that operably couples to the snap ring 156. Due to the operable coupling between the catch 157 and the snap ring 156, when the sleeve 111 is moved rearward, the clutch 158 may move together with the sleeve 111 into the jaw actuating position. The catch 157 may also operably couple with clutch 158 opposite the snap ring 156 to permit the clutch 158 to be moved forward, via the sleeve 111, into the working position. While the operable coupling with catch 157 facilitates engaged motion of the sleeve 111 with the clutch 158, the operable coupling does not inhibit the sleeve 111's ability to rotate relative to the clutch 158 about the center axis 50.

With reference to FIGS. 13 through 15, according to some example embodiments, the sleeve 111 may also include a lug 113 disposed on an internal surface of the sleeve 111. The lug 111 may be configured to operably couple with a groove 223 of the static member 222 as shown in FIG. 15. In this regard, since static member 222 may be fixed in a stationary position relative to the drive spindle 210, the sleeve 111 may also be held in a rotationally fixed position relative to the drive spindle 210 when the sleeve 111 and the clutch 158 are in the jaw actuating position and the lug 111 is operably coupled with the groove 223. As such, similar to chuck 100, when the clutch 158 is held rotationally stationary relative to the drive spindle 210, the front body 130 is also held stationary and the rear body 160 may rotate and cause the jaws 101 to move in an opening or closing direction based on the rotation direction of the drive spindle 210.

FIGS. 16 through 25 illustrate another example chuck 400 and various components and views thereof, according to some example embodiments. FIG. 16 is a side cross-section view of the chuck 400. For orientation purposes, the chuck 400 may have a forward end 60 and a rearward end 70. Similar to the chuck 100, the chuck 400 may include a clutch 450 that is operable to transition the chuck 400 between a working mode and a jaw actuation mode. As such, the clutch 450 may be movable into a working position to cause the chuck 400 to be in the working mode and the clutch 450 may be movable into a jaw actuating position to cause the chuck 400 to be in the jaw actuation mode. In the working mode, the chuck 400 may be configured to drive a working bit (not shown) installed in the jaws 401 of the chuck 400 to, for example, turn a fastener, drill a hole, or the like. In the jaw actuation mode, the chuck 400 may be configured to cause the jaws 401 to open or close to allow for removal or installation of a working bit. To transition the chuck 400 between the working mode and the jaw actuation mode, the clutch 450 may be moveable along the center axis 50 to couple a rear body 460 to, or decouple the rear body 460 from, a front body 430.

As shown in FIGS. 16 and 17, the front body 430 may be operably coupled to the jaws 401 via jaw passageways 431 in the front body 430. In this regard, a plurality of jaws 401 may be configured to move into an out of jaw passageways 431. According to some example embodiments, the chuck 400 may include three jaws 401 and the front body 430 may include three associated jaw passageways 431. The jaw passageways 431 may operate to permit the jaws 401 to move rearward into the front body 430 (i.e., in a jaw opening direction) and forward out of the front body 430 (i.e., in a jaw closing direction). In this regard, as the jaws 401 move forward within the passageways 431 in the jaw closing direction, the jaws 401 may move along a respective angle relative to the center axis 50 such that the jaws 401 meet at a point on the center axis 50 forward of the front body 430. Similarly, as the jaws 401 move rearward within the passageways 431 in the jaw opening direction, the jaws 401 may move along the respective angles relative to the center axis 50 such that the jaws 401 move away from that point on the center axis 50 forward of the front body 430. Accordingly, the jaws 401 may move relative to the front body 430 in the jaw passageway 431, but the jaws 401 may be operably coupled to the front body 430 such that the jaws 401 rotate with the front body 430, regardless of whether the chuck 400 is in the working mode or in the jaw actuation mode.

The jaws 401 may include jaw teeth 402 that operably couple to a nut 415 and, more specifically, the nut thread 416 to move the jaws 401. According to some example embodiments, the jaws 401 may have the jaw teeth 402 disposed on an internal surface of the of the jaws 401 and facing inward towards the center axis 50. As such, the nut 415 may be disposed internal to the jaws 401 and the nut thread 416 may face outwards to operably couple with the inward facing jaw teeth 402. As further described herein, the nut 415 may rotate relative to the jaws 401, when the chuck 400 is in a jaw actuation mode, to cause the jaws 401 to move relative to the front body 430 forward and together or rearward and apart through screw action between the nut thread 416 and jaw teeth 402. Additionally, when the chuck 400 is in the working mode, the nut 415 may rotate with the jaws 401 and therefore no relative movement occurs to cause the jaws 401 to move in the opening or closing directions.

Rear body 460 of the chuck 400 may be an elongate, substantially cylindrical member as best seen in FIG. 19, which is a perspective view of the rear body 460 and the nut 415 dissembled from the clutch 450. The rear body 460 may operably couple to a drive spindle (not shown) of a power driver to the chuck 400. In this regard, the rear body 460 may include a bore that is configured to receive and secure the drive spindle to the rear body 460. The rear body 460 may be configured to rotate with the drive spindle, regardless of whether the chuck 400 is in the working mode or the jaw actuation mode. As further described herein, the rear body 460 may also include rear body teeth 461 disposed about an outer circumferential wall of the rear body 460 and oriented in a rearward direction. Additionally, the rear body 460 may affixed or integrated with the nut 415 for operable coupling with the jaw teeth 402.

The clutch 450 may operate to couple and decouple the front body 430 to a rear body 460 to transition the chuck 400 between the working mode and jaw actuation mode. The clutch 150 may include features that operably couple the clutch 450 to both the front body 430 and the rear body 460. In this regard, the front body 430 may be operably coupled to a front sleeve 410 and a rear sleeve 411. The front body 430 may be operably coupled to the front sleeve 410 such that the front sleeve 410 may rotate relative to the front body 430, but the front sleeve 410 may not move or translate relative to the front body 430. In this regard, according to some example embodiments, the front sleeve 410 may be free to rotate relative to any of the components of the chuck 400, thereby permitting a user to hold the front sleeve 410 while operating a power driver operably coupled to the chuck 400. The rear sleeve 411 may be configured to rotate with the front body 430, but the rear sleeve 411 may also be configured to translate or move relative to the front body 430. In this regard, the front body 430 may have a plurality of pins 446 affixed thereto that the rear sleeve 411 may slide on in parallel to the center axis 50. A user may engage the rear sleeve 411 (e.g., with their fingers) to move the rear sleeve 411 forward and cause the chuck 400 to be in the working mode and rearward to cause the chuck 400 to be in the jaw actuation mode.

In this regard, the rear sleeve 411 may be operably coupled with the clutch 450. The rear sleeve 411 may rotate and translate with the clutch 450. With reference to FIG. 18, which is a cross-section rear view of the chuck 400, it can be seen that the clutch 450 includes drive lugs 455 that operably couple to recesses 414 of the rear sleeve 411. Due to the operable coupling between the drive lugs 455 of the clutch 450 and the recesses 414 of the rear sleeve 411, the rear sleeve 411 and the clutch 450 rotate together. Additionally, the clutch 450 and the rear sleeve 411 also move axially together. In this regard, the rear sleeve 411 may include a protrusion 412 that is disposed between a catch 470 of the clutch 450 and a ball 471. When the rear sleeve 411 moves in the rearward direction, the operable coupling between the protrusion 412 and the catch 470 may cause the clutch 450 to also move rearward. Further, when the rear sleeve 411 moves in the forward direction, the operable coupling between the protrusion 412 and the ball 471, which is operably coupled to the clutch 450 via the opening 459 in the clutch 450, may cause the clutch 450 to also move forward. As such, the rear sleeve 411 may rotate and translate with the clutch 450 regardless of whether the chuck 400 is in the working mode or the jaw actuation mode.

When the clutch 450 moves between the working position and the jaw actuating position, the clutch 450 may move relative to the front body 430 and the rear body 460. In the working position, the clutch 450 and the rear sleeve 411 may be moved in a forward direction along the center axis 50 relative to the front body 430 and the rear body 460. In the jaw actuating position, the clutch 450 and the rear sleeve 411 may be moved in a rearward direction along the center axis 50 relative to the front body 430 and the rear body 460. In this regard, as seen in FIG. 16, the rear sleeve 411 may include a working position depression 433 and, forward of the working position depression 433, a jaw actuating position depression 434. In this regard, the front body 430 may be configured to receive one or more spring plunger assemblies 445 in respective cavities of the front body 430 that operably couple with either the working position depression 433 or the jaw actuating position depression 434. According to some example embodiments, the spring plunger assembly 145 may comprise a ball and a spring. According to some example embodiments, a plurality of spring plunger assemblies (e.g., three) may be disposed in association with the front body 430. The spring plunger assembly 445 may operate with the working position depression 433 and a jaw actuating position depression 434 to lock or maintain the rear sleeve 411, and therefore the clutch 450, in the working position or the jaw actuating position. In this regard, the spring plunger assembly 445 may be disposed within an opening in the front body 430 such that the spring biased ball may extend out of a cavity of the front body 430. Accordingly, when the clutch 450 is in the working position, the spring plunger assembly 445 may be operably coupled with the working position depression 433 of the rear sleeve 411, and when the clutch 450 is in the jaw actuating position, the spring plunger assembly 445 may be operably coupled with the jaw actuating position depression 434 of the rear sleeve 411.

With respect to the interface between the clutch 450 and the rear body 460, the clutch 450 may also move axially between the working position and jaw actuating position relative to the rear body 460. In this regard, movement of the clutch 450 between the working position and the jaw actuating position may operably couple and decouple the clutch teeth 451 with the rear body teeth 461, respectively. In this regard, the clutch 450 may include clutch teeth 451 that face forward to operably couple with the rearward facing rear body teeth 461.

As such, when the clutch 450 is in the working position, the clutch teeth 451 are operably coupled with the rear body teeth 461, and therefore the clutch 450 rotates with the rear body 460. Additionally, when the clutch 450 is in the working position, the ball 471, that is maintained in the opening 459 of the clutch 450, is moved into, and operably coupled with, the groove 463 of the rear body 460. Additionally, the ball 471 is held in the groove 463 by the protrusion 412 of the rear sleeve 411. This operable coupling between the rear sleeve 411, the ball 471, the clutch 450, and the groove 463 of the rear body 460 maintains these components in engagement such that rotary motion of the rear body 160, via the drive spindle, operates to rotate rear sleeve 411, the ball 471, the clutch 450, and accordingly, the front body 430 and the jaws 401.

In contrast, when the clutch 450 is in the jaw actuating position, the clutch teeth 451 are decoupled from (i.e., not in physical contact with) the rear body teeth 461, and therefore the rear body 460 may rotate relative to the clutch 450. The ball 471 is moved out of the groove 463 and protrusion 412 of the rear sleeve 411 does not engage the ball 471. Therefore, the rear body 160 is free to rotate relative to the clutch 450, the rear sleeve 411, and the front body 430 to cause the jaws 401 to move in an opening or closing direction due to rotation of the nut 415 via the rear body 460. As such, when the clutch 450 is in the jaw actuating position, the clutch 450 is decoupled from the rear body 460 and the rear body 460 is free to rotate relative to the clutch 450, the rear sleeve 411, and the front body 430.

According to some example embodiments, when the rear sleeve 411 moves rearward and the clutch 450 moves into the jaw actuating position, the rear sleeve 411 may move into operable coupling with a static member 520. The static member 520 may be configured to remain rotationally stationary relative to, for example, the drive spindle of a power driver that is operably coupled to the chuck 400. Therefore, when the rear sleeve 411 moves into operable coupling with a static member 520, the rear sleeve 411 and the clutch 450 may also be held rotationally stationary while engaged with the static member 520. In this regard, according to some example embodiments, the static member 520 may be affixed to or integrated into a housing portion of the power driver. According to some example embodiments, the static member 520 may be an adapter (e.g., an adapter plate) that is, for example, adhered to, or otherwise installed on, a housing portion of the power driver. As shown in FIG. 21, the static member 520 may include recesses 521 that are configured to operably couple to static member engagement teeth 454 of the rear sleeve 411, as shown in FIG. 20. In this regard, when the rear sleeve 411 is moved rearward, thereby moving the clutch 450 into the jaw actuating position, the operable coupling between the static member engagement teeth 454 of the rear sleeve 411 and the recesses 521 may prevent the rear sleeve 411 and clutch 450 from rotating, and the clutch 450 may be held rotationally stationary relative to the drive spindle.

With the components of the chuck 400 described, FIGS. 22 through 25 show the configuration of some of the components of the chuck 400 when the clutch 450 is in the working position, i.e., FIGS. 22 and 23, and when the clutch 450 is in the jaw actuating position, i.e., FIGS. 24 and 25. In FIG. 22, the clutch 450 has been moved forward into the working position and the chuck 400 is in the working mode. In this regard, a user has acted upon the rear sleeve 411 to move the rear sleeve 411 and the clutch 450 in the forward direction as indicated by arrow 52 and into the working position. As such, the spring plunger assembly 445 housed within the front body 430 has operably coupled with the working position recess 433 of the rear sleeve 411 thereby maintaining the rear sleeve 411 and clutch 450 in the working position. Additionally, as best seen in FIG. 23, the ball 471 is disposed in the groove 463 because the ball 471 and the opening 459 of the clutch 450 align with the groove 463 when the clutch 450 is in the working position. Further, the protrusion 412 of the rear sleeve 411 holds the ball 471 in the groove 463 by blocking the ball 471 from moving out of the groove 463. As such, an operable coupling is formed between the rear body 460 (via the groove 463), the ball 471, the clutch 450 (via the opening 459 that holds the ball 471), and the rear sleeve 411 (via the protrusion 412). The rear sleeve 411 is decoupled from the static member 520 and therefore the clutch 450 and the front body 430 are free to rotate relative to the static member 520. Further, the clutch teeth 451 are operably coupled to rear body teeth 461 and therefore the clutch 450 rotates with the rear body 460. Since the clutch 450 is operably coupled to the front body 430 via the rear sleeve 411 and the pins 446, the front body 430 therefore rotates with the rear body 460, thereby also rotating the jaws 401 and possibly a working bit installed in the jaws 401. Accordingly, there is no relative rotational movement between the nut 415 and the jaws 401 and therefore the jaws 401 do not move in the opening or closing direction. As such, rotation of a drive spindle of a power driver operates to rotate rear body 460 and the front body 430 in unison about the center axis 50. Notably, the front sleeve 410 is not operably coupled to any rotating component and therefore no rotational force is applied to the front sleeve 410 (other than minor frictional forces) and the front sleeve 410 is free to rotate relative to the other components of the chuck 400 while the chuck 400 is in the working mode.

FIGS. 24 and 25 show the clutch 450 in the jaw actuating position and the chuck 400 in the jaw actuation mode. A user has acted upon the rear sleeve 411 to move the rear sleeve 411 and the clutch 450 in the rearward direction as indicated by arrow 54 and into the jaw actuating position. As such, the spring plunger assembly 445 housed within the front body 430 has operably coupled with the jaw actuating position recess 434 of the rear sleeve 411 thereby maintaining the rear sleeve 411 and the clutch 450 in the jaw actuating position. Although not shown, the rear sleeve 411 is also operably coupled to the static member 520 to prevent rotation of the rear sleeve 411 and the clutch 450, and therefore the front body 430, when the rear body 460 is rotated by a drive spindle. Additionally, the clutch teeth 451 are decoupled from the rear body teeth 461 and therefor the rear body 460 is free to rotate relative to the clutch 450, the rear sleeve 411, and the front body 430. Additionally, as seen in FIG. 25, movement of the protrusion 412 pushes against the catch 470 to cause the clutch 450 to move rearward. This movement of the clutch 450 into the jaw actuating position moves the ball 471 out of the groove 463, thereby releasing the operable coupling between the rear sleeve 411, the ball 471, and the rear body 160 that is present in the working mode. Due to the decoupling of the rear body 460 from the front body 430, nut 415 may rotate relative to the front body 430 thereby causing the jaws 401 to move in the opening or closing direction based the direction the drive spindle is rotating. Further, during motion of the jaws 401 in the closing or opening direction, the jaws 401 do not rotate because the front body 430 is held rotationally stationary by the rear sleeve 411 and the static member 520. Notably, the front sleeve 410 is not operably coupled to any rotating component and therefore no rotational force is applied to the front sleeve 410 (other than minor frictional forces) and the front sleeve 410 is free to rotate relative to the other components of the chuck 400 while the chuck 400 is in the jaw actuation mode.

FIGS. 26 through 32 illustrate another example chuck 600 and various components and views thereof, according to some example embodiments. FIG. 26 is a side cross-section view of the chuck 600. For orientation purposes, the chuck 600 may have a forward end 60 and a rearward end 70. Similar to the chuck 400, the chuck 600 may include a clutch 650 that is operable to transition the chuck 600 between a working mode and a jaw actuation mode. As such, the clutch 650 may be movable into a working position to cause the chuck 600 to be in the working mode and the clutch 650 may be movable into a jaw actuating position to cause the chuck 600 to be in the jaw actuation mode. In the working mode, the chuck 600 may be configured to drive a working bit (not shown) installed in the jaws 601 of the chuck 600 to, for example, turn a fastener, drill a hole, or the like. In the jaw actuation mode, the chuck 600 may be configured to cause the jaws 601 to open or close to allow for removal or installation of a working bit. To transition the chuck 600 between the working mode and the jaw actuation mode, the clutch 650 may be moveable along the center axis 50 to couple a rear body 660 to, or decouple the rear body 660 from, a front body 630.

The front body 630, as also shown in FIG. 28, may operably couple with the jaws 601 via jaw passageways 631 in the front body 630. In this regard, a plurality of jaws 601 may be configured to move into an out of jaw passageways 631. According to some example embodiments, the chuck 600 may include three jaws 601 and the front body 630 may include three associated jaw passageways 631. The jaw passageways 631 may operate to permit the jaws 601 to move rearward into the front body 630 (i.e., in a jaw opening direction) and forward out of the front body 630 (i.e., in a jaw closing direction). In this regard, as the jaws 601 may move forward within the passageways 631 in the jaw closing direction, the jaws 601 may move along a respective angle relative to the center axis 50 such that the jaws 601 meet at a point on the center axis 50 forward of the front body 630. Similarly, as the jaws 601 move rearward within the passageways 631 in the jaw opening direction, the jaws 601 may move along the respective angles relative to the center axis 50 such that the jaws 601 move away from that point on the center axis 50 forward of the front body 630. Accordingly, the jaws 601 may move relative to the front body 630 in the jaw passageway 631, but the jaws 601 may be operably coupled to the front body 630 such that the jaws 601 rotate with the front body 630, regardless of whether the chuck 600 is in the working mode or in the jaw actuation mode.

The jaws 601 may include jaw teeth 602 that operably couple to a nut 615 and, more specifically, the nut thread 616 to move the jaws 601. According to some example embodiments, the jaws 601 may have the jaw teeth 602 disposed on an internal surface of the of the jaws 601 and facing inward towards the center axis 50. As such, the nut 615 may be disposed internal to the jaws 601 and the nut thread 616 may be facing outwards to operably couple with the inward facing jaw teeth 402. As further described herein, the nut 615 may rotate relative to the jaws 601, when the chuck 600 is in a jaw actuation mode, to cause the jaws 601 to move relative to the front body 630 forward and together or rearward and apart through screw action between the nut thread 616 and jaw teeth 602. Additionally, when the chuck 600 is in the working mode, the nut 615 may rotate with the jaws 601 and therefore no relative movement occurs to cause the jaws 601 to move in the opening or closing directions.

Rear body 660 of the chuck 600 may be an elongate, substantially cylindrical member as best seen in FIG. 27, which is a perspective view of the rear body 660 and the nut 615 dissembled from the clutch 650. The rear body 660 may operably couple to a drive spindle (not shown) of a power driver to the chuck 600. In this regard, the rear body 660 may include a bore that is configured to receive and secure the drive spindle to the rear body 660. In this regard, the rear body 660 may be configured to rotate with the drive spindle, regardless of whether the chuck 600 is in the working mode or the jaw actuation mode. As further described herein, the rear body 660 may also include rear body teeth 661 disposed about an outer circumferential wall of the rear body 660 and oriented in a rearward direction. Additionally, the rear body 660 may affixed or integrated with the nut 615 for operable coupling with the jaw teeth 602.

The clutch 650 may operate to couple and decouple the front body 630 to a rear body 660 to transition the chuck 600 between the working mode and jaw actuation mode. The clutch 650 may include features that operably couple the clutch 650 to both the front body 630 and the rear body 660. In this regard, the front body 630 may be operably coupled to a front sleeve (not shown), a rear sleeve 411, and the clutch 650. The front body 630 may be operably coupled to the front sleeve such that the front sleeve may rotate relative to the front body 630, but the front sleeve may not move or translate relative to the front body 630. In this regard, according to some example embodiments, the front sleeve may be free to rotate relative to any of the components of the chuck 600, thereby permitting a user to hold the front sleeve while operating a power driver operably coupled to the chuck 600.

The rear sleeve 611 and the clutch 650 may be configured to rotate with the front body 630, but the rear sleeve 611 and the clutch 650 may also be configured to translate or move relative to the front body 630 along the center axis 50. In this regard, the front body 630 may have a plurality of slots 652 about a circumference of the front body 630. The rear sleeve 611 may include one or more protruding members 612 that align with a respective slot 652, so that the rear sleeve 611 may rotate with the front body 630, but is also permitted to move axially relative to the front body 630. Similarly, the clutch 650 may include one or more protrusions 652 that align with a respective slot 652, so that the clutch 650 may also rotate with the front body 630 but is permitted to move axially relative to the front body 630. Via the protruding members 612, the rear sleeve 611 may also operably couple with the clutch 650 such that the rear sleeve 611 and the clutch 650 may together move axially. As such, the front body 630, the clutch 650, and the rear sleeve 611 may rotate together due to respective operable coupling with the slots 652, and the rear sleeve 611 and clutch 650 may be capable of moving together axially relative to the front body 630 together. In this regard, a user may engage the rear sleeve 611 (e.g., with their fingers) to move the rear sleeve 611 and cause the chuck 600 to be in the working mode or the jaw actuation mode as further described below.

In this regard, with reference to FIG. 29, the rear sleeve 611 may include a protrusion 612 that operably couples to a ball 671 that is received in an opening 659 of the clutch 650. The protrusion 612 may also operably couple to a catch 670 of the clutch 650. In the working position, as shown in FIG. 29, the rear sleeve 611 is in a forward position where an inward facing surface of the protrusion 612 is operably coupled with the ball 671 and the ball 671 is disposed in the groove 663 of the rear body 660. Further, the clutch teeth 651 are also operably coupled to the rear body teeth 661, when the clutch 650 is in the working position. To transition to the jaw actuating position, the rear sleeve 611 may move rearward such that the protrusion 612 operably couples to the catch 670 to pull the clutch 650 away from the rear body 660 thereby decoupling the clutch teeth 651 from the rear body teeth 661. Further, in the jaw actuating position, the ball 671 moves out of the groove 663 in the rear body 660 and into a position forward of the protrusion 612 and rearward of the groove 663. To move back into the working position, the spring 680 may urge both the rear sleeve 611 and the clutch 650 in the forward direction where the ball 671 moves back into the groove 663 and operably couples to the inward facing surface of the protrusion 612, and the clutch teeth 651 operably couple with the rear body teeth 661.

Accordingly, when the clutch 650 moves between the working position and the jaw actuating position, the clutch 650 may move relative to the front body 630 and the rear body 660. In the working position, the clutch 650 and the rear sleeve 611 may be moved in a forward direction along the center axis 50 relative to the front body 630 and the rear body 660. In the jaw actuating position, the clutch 650 and the rear sleeve 611 may be moved in a rearward direction along the center axis 50 relative to the front body 630 and the rear body 660.

With respect to the interface between the clutch 650 and the rear body 660, the clutch 650 may also move axially between the working position and jaw actuating position relative to the rear body 660. In this regard, movement of the clutch 650 between the working position and the jaw actuating position may operably couple and decouple the clutch teeth 651 with the rear body teeth 661, respectively. In this regard, the clutch 650 may include clutch teeth 651 that face forward to operably couple with the rearward facing rear body teeth 661.

As such, when the clutch 650 is in the working position, the clutch teeth 651 are operably coupled with the rear body teeth 661, and therefore the clutch 650 rotates with the rear body 660. Additionally, when the clutch 650 is in the working position, the ball 671, that is maintained in the opening 659 of the clutch 650, is moved into and operably coupled with the groove 663 of the rear body 660. Additionally, the ball 671 is held in the groove 663 by the protrusion 612 of the rear sleeve 611. This operable coupling between the rear sleeve 611, the ball 671, the clutch 650, and the groove 663 of the rear body 660 operates to maintain these components in engagement such that rotary motion of the rear body 660, via the drive spindle, operates to rotate rear sleeve 611, the ball 671, the clutch 650, and accordingly, the front body 630 and the jaws 601.

In contrast, when the clutch 650 is in the jaw actuating position, the clutch teeth 651 are decoupled from (i.e., not in physical contact with) the rear body teeth 661, and therefore the rear body 660 may rotate relative to the clutch 650. The ball 671 is moved out of the groove 663 and the rear sleeve 611 protrusion 612 does not engage the ball 671 in the direction of the rear body 660. Therefore, the rear body 660 is free to rotate relative to the clutch 650, the rear sleeve 611, and the front body 630 to cause the jaws 601 to move in an opening or closing direction due to rotation of the nut 615 via the rear body 660. As such, when the clutch 650 is in the jaw actuating position, the clutch 650 is decoupled from the rear body 660 and the rear body 660 is free to rotate relative to the clutch 650, the rear sleeve 611, and the front body 630.

According to some example embodiments, when the rear sleeve 611 moves rearward and the clutch 650 moves into the jaw actuating position, the rear sleeve 611, or a member that is in rotationally fixed engagement with the rear sleeve 611 and may thus be considered a component of the rear sleeve 611, may move into operable coupling with a static member (not shown). The static member may be configured to remain rotationally stationary relative to, for example, the drive spindle of a power driver that is operably coupled to the chuck 600. Therefore, when the rear sleeve 611 moves into operable coupling with a static member, the rear sleeve 611 and the clutch 650 may also be held rotationally stationary while engaged with the static member. In this regard, according to some example embodiments, the static member may be affixed to or integrated into a housing portion of the power driver. According to some example embodiments, the static member may be an adapter (e.g., an adapter plate) that is, for example, adhered to, or otherwise installed on, a housing portion of the power driver. The static member may include recesses that are configured to operably couple to static member engagement teeth of the rear sleeve 611. In this regard, when the rear sleeve 611 is moved rearward thereby moving the clutch 650 into the jaw actuating position, the operable coupling between the static member engagement teeth of the rear sleeve 611 and the recesses of the static member may prevent the rear sleeve 611 and clutch 650 from rotating, and the clutch 650 may be held rotationally stationary relative to the drive spindle.

Additionally, according to some example embodiments, the rear sleeve 611 may also operably couple to a lock ring 690. The lock ring 690 may operate in coordination with a one or more positioning lugs 681 of the rear sleeve 611 to hold the rear sleeve 611, and therefore the clutch 650, in either the working position or the jaw actuating position and ratchet between the positions. In this regard, the lock ring 690 may be permitted to rotate relative to the rear sleeve 611 within the chuck 600, but the lock ring 690 may otherwise remain fixed and not permitted to move in an axial direction along the center axis 50. The rear sleeve 611 may be permitted to move relative to the lock ring 690 along the center axis 50, but may be urged in the forward direction by the one or more springs 680. As such, in order to move the rear sleeve 611 rearward, a user may be required to overcome the force of the springs 680.

Accordingly, the operation of the positioning lug 681 relative to the lock ring 690 is described with reference to FIGS. 31 to 33. As a component of the rear sleeve 611, the positioning lug 681 may be configured to move axially within a channel 696 of the lock ring to rotate the lock ring 690 or come to rest in either a jaw actuation lug position 694 or a working lug position 695. The lock ring 690 may have teeth disposed on either side of the channel 696. On the rearward side of the channel 696, the lock ring 690 may include a series of lock ring rotation guide teeth 691. The lock ring rotation guide teeth 691 may have an angled engagement surface that engages with a complementary angled surface of the positioning lug 681 thereby operating translate the axial movement of the positioning lug 681 into rotational movement of the lock ring 690 in the direction of the arrow 700. This rotational movement of the lock ring 690 may occur as the positioning lug 681 is moved into contact with the lock ring rotation guide teeth 691 when a user pulls the rear sleeve 611 in a rearward direction.

Additionally, on the forward side of the channel 696, the lock ring 690 may include a series of guide tooth couples. Each couple may include a jaw actuation position guide tooth 692 and a working position guide tooth 693. Each couple may include a jaw actuation lug position 694 disposed between the jaw actuation position guide tooth 692 and a working position guide tooth 693 that prevents the positioning lug 681 form moving forward beyond an edge of the lock ring 690. Each couple may be followed by a gap that is the working lug position 695. Both the jaw actuation position guide tooth 692 and the working position guide tooth 693 may have an angled engagement surface that engages with a complementary angled surface of the positioning lug 681 to cause translation of the axial movement of the positioning lug 681 into rotational movement of the lock ring 690 in the direction of the arrow 700 as the positioning lug 681 is moved into contact with the jaw actuation position guide tooth 692 or the working position guide tooth 693.

In this regard, as the positioning lug 681 moves forward, for example in response to the urging of the spring 680, the positioning lug 681 may engage with the angled surface of the jaw actuation position guide tooth 692 and the lock ring 690 may rotate to position the positioning lug 681 in the jaw actuation lug position 694. When the positioning lug 681 is in the jaw actuation lug position 694, the rear sleeve 611 has moved the clutch 650 into the jaw actuating position as described above. Similarly, as the positioning lug 681 moves forward, for example in response to the urging of the spring 680, the positioning lug 681 may engage with the angled surface of the working position guide tooth 693 and the lock ring 690 may rotate to position the positioning lug 681 in the working lug position 695. When the positioning lug 681 is in the working lug position 695, the rear sleeve 611 has moved the clutch 650 into the working position as described above.

Now with reference to FIG. 31, the positioning lug 681 is shown in the jaw actuation lug position 694. This engagement between the lock ring 690 and the positioning lug 681 prevents the rear sleeve 611 from moving forward in response to the urging of the spring 680 and therefore the clutch 650 is positioned in the jaw actuating position decoupling the front body 630 from the rear body 660 and permitting the jaws 601 to move in the opening or closing position in response to rotation of a drive spindle operably coupled to the rear body 660.

With reference to FIG. 32, a user has pulled the rear sleeve 611 in a rearward direction thereby moving the positioning lug 681 rearward and into engagement with a lock ring rotation guide tooth 691. This axial movement of the positioning lug 681 is translated into rotational movement of the lock ring 690 to thereby align the positioning lug 681 with a next working position guide tooth 693. In FIG. 33, it can be seen that, for example, the rear sleeve 611 has been released by the user and the spring 680 has urged the rear sleeve 611 and the positioning lug 681 forward. Upon engagement with the working position guide tooth 693, the locking ring 690 has rotated to position the positioning lug 681 in the working lug position 695. As such, the rear sleeve 611 is permitted to move forward, and also move the clutch 650 forward into the working position, where the clutch 650 operably couples the rear body 660 with the front body 630.

As such, according to some example embodiments, a chuck for use with a power driver having a rotatable drive spindle is provided. The chuck may comprise a plurality of jaws, with each jaw including jaw teeth. The chuck may further comprise a front body. In this regard, the plurality of jaws may be configured to rotate with the front body about a center axis of the chuck. Further, the plurality of jaws may also be configured to move relative to the front body in an opening or closing direction. The chuck may further comprise a nut operably coupled with at least some of the jaw teeth of the jaws such that rotation of the nut relative to the front body moves the jaws relative to the front body. The chuck may also comprise a rear body including rear body teeth. In this regard, the rear body may be configured to rotate with a drive spindle of the power driver. Further, the chuck may further comprise a clutch including clutch teeth. The clutch may be operably coupled to the front body such that the clutch rotates with the front body. The clutch may be configured to move between a working position and a jaw actuating position. In the working position, the clutch teeth may be engaged with the rear body teeth such that rotation of the rear body by the drive spindle rotates the clutch, the front body, and the jaws. In the jaw actuating position, the clutch teeth may not or need not be engaged with the rear body teeth and the rear body may be configured to rotate the nut relative to the front body to move the jaws relative to the front body.

According to some example embodiments, the chuck may further comprise a sleeve that is disposed about the front body. In this regard, the sleeve does not rotate with the front body or the rear body. Further, according to some example embodiments, the chuck may further comprise an intermediate gear. In this regard, the rear body comprises a rear body gear, and the nut is affixed to an inner gear. The intermediate gear is configured to operably couple the rear body gear to the inner gear to turn the nut. Further, according to some example embodiments, the chuck may further comprise a spring plunger assembly configured to maintain the clutch in the working position or the jaw actuating position. According to some example embodiments, the spring plunger assembly may comprise a spring biased ball that engages with the cavities of the clutch. Further, according to some example embodiments, the spring plunger assembly may comprise a movable ball that rolls into an out of respective recesses to maintain the clutch in either the working position or the jaw actuation position. According to some example embodiments, the clutch is further configured to move parallel to the center axis and relative to the front body. According to some example embodiments, the chuck may further comprise a sleeve, a spring, and a lock ring. In this regard, the sleeve may be configured to move the clutch, against a bias of the spring, into the working position or the jaw actuation position in response to a positioning lug of the sleeve engaging with the lock ring. Further, according to some example embodiments, the chuck may further comprise a sleeve that is disposed about the front body. In this regard, the sleeve is configured to move with the clutch into the working position or the jaw actuation position. Further, the sleeve is configured to rotate about the center axis relative to the clutch. According to some example embodiments. the rear body may comprise the nut and wherein the nut is operably coupled to the jaw teeth and wherein the jaw teeth are disposed on an internal facing surface of the jaws. Further, according to some example embodiments, the clutch or a sleeve operably coupled to the clutch may be moveable to operable couple with a static member that is rotationally stationary relative to the drive spindle. The clutch or sleeve may operably couple with static member to prevent rotation of the clutch with the drive spindle.

According to some example embodiments, another chuck for use with a power driver having a rotatable drive spindle is provided. The chuck may comprise a plurality of jaws with each jaw including jaw teeth. The chuck may further comprise a front body. The plurality of jaws may be configured to rotate with the front body about a center axis of the chuck. The plurality of jaws may also be configured to move relative to the front body in an opening or closing direction. The chuck may further comprise a sleeve operably coupled to the front body to permit rotational movement relative to the front body but not axial movement relative to the front body. The chuck may further comprise a nut operably coupled with at least some of the jaw teeth of the jaws such that rotation of the nut relative to the front body moves the jaws relative to the front body. The chuck may further comprise a rear body including rear body teeth. The rear body may be configured to rotate with a drive spindle of the power driver. The chuck may further comprise a clutch including clutch teeth. The clutch may be operably coupled to the front body such that the clutch rotates with the front body. The clutch may be configured to move between a working position and a jaw actuating position. In the working position, the clutch teeth may be engaged with the rear body teeth such that rotation of the rear body by the drive spindle rotates the clutch, the rear sleeve, the front body, and the jaws. In the jaw actuating position, the clutch teeth are not engaged with the rear body teeth and the rear body is configured to rotate the nut relative to the front body, the rear sleeve, and the clutch to move the jaws relative to the front body.

According to some example embodiments, the chuck may further comprise a rear sleeve operably coupled to the clutch to rotate with the clutch and move axially with the clutch. The front body comprises one or more pins that operably couple with the rear sleeve to permit relative axial movement of the rear sleeve relative to the front body. According to some example embodiments, the chuck may further comprise an intermediate gear. In this regard, the rear body may comprise a rear body gear. Additionally, the nut may be affixed to an inner gear and the intermediate gear may be configured to operably couple the rear body gear to the inner gear to turn the nut. According to some example embodiments, the chuck may further comprise a spring plunger assembly configured to maintain the clutch in the working position or the jaw actuating position. According to some example embodiments, the spring plunger assembly may comprise a spring biased ball that engages with the cavities of the clutch. Further, the spring plunger assembly may comprise a movable ball that rolls into an out of respective recesses to maintain the clutch in either the working position or the jaw actuation position. Further, according to some example embodiments, the clutch may be configured to move parallel to the center axis and relative to the front body. According to some example embodiments, the chuck may further comprise a rear sleeve, a spring, and a lock ring. The rear sleeve may be configured to move the clutch, against a bias of the spring, into the working position or the jaw actuation position in response to a positioning lug of the rear sleeve engaging with the lock ring.

Many modifications and other embodiments of the chuck set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a power driver having a rotatable drive spindle, the chuck comprising:
    a plurality of jaws, each jaw including jaw teeth;
    a front body, wherein the plurality of jaws are configured to rotate with the front body about a center axis of the chuck, wherein the plurality of jaws are also configured to move relative to the front body in an opening or closing direction;
    a nut operably coupled with at least some of the jaw teeth of the jaws such that rotation of the nut relative to the front body moves the jaws relative to the front body;
    a rear body configured to rotate with a drive spindle of the power driver; and
    a clutch operably coupled to the front body such that the clutch rotates with the front body in at least one of a working position and a jaw actuating position, wherein the clutch is configured to move between the working position and the jaw actuating position;
    wherein, in the working position, the clutch and rear body are configured such that rotation of the drive spindle rotates the front body and the jaws, and
    wherein, in the jaw actuating position, the clutch and the rear body are configured such that rotation of the drive spindle rotates the nut relative to the front body to move the jaws relative to the front body;
    wherein the chuck further comprises an intermediate gear, wherein, in at least one of the working position and the jaw actuating position, rotation of the rear body causes rotation of the intermediate gear, and the intermediate gear is configured to operably couple the rear body to turn the nut.

2. The chuck of claim 1, further comprising a sleeve that is disposed about the front body, wherein the sleeve does not rotate with the front body or the rear body.

3. The chuck of claim 1 further comprising a spring plunger assembly configured to maintain the clutch in the working position or the jaw actuating position.

4. The chuck of claim 3, wherein the spring plunger assembly comprises a spring biased ball that engages with the cavities of the clutch.

5. The chuck of claim 3, wherein the spring plunger assembly comprises a movable ball that rolls into and out of respective recesses to maintain the clutch in either the working position or the jaw actuation position.

6. The chuck of claim 1, wherein the clutch is configured to move parallel to the center axis and relative to the front body.

7. The chuck of claim 1, further comprising a sleeve that is disposed about the front body, wherein the sleeve is configured to move with the clutch into the working position or the jaw actuation position, and wherein the sleeve is configured to rotate about the center axis relative to the clutch.

8. The chuck of claim 1, wherein the clutch or a sleeve operably coupled to the clutch is moveable to operably couple with a static member that is rotationally stationary relative to the drive spindle, wherein the clutch or the sleeve operably couples with the static member to prevent rotation of the clutch with the drive spindle.

9. A chuck for use with a power driver having a rotatable drive spindle, the chuck comprising:
    a plurality of jaws, each jaw including jaw teeth;
    a front body, wherein the plurality of jaws are configured to rotate with the front body about a center axis of the chuck, wherein the plurality of jaws are also configured to move relative to the front body in an opening or closing direction;

a nut operably coupled with at least some of the jaw teeth of the jaws such that rotation of the nut relative to the front body moves the jaws relative to the front body;

a rear body configured to rotate with a drive spindle of the power driver; and a clutch operably coupled to the front body such that the clutch rotates with the front body in at least one of a working position and a jaw actuating position, wherein the clutch is configured to move between the working position and the jaw actuating position;

wherein, in the working position, the clutch and rear body are configured such that rotation of the drive spindle rotates the front body and the jaws;

wherein, in the jaw actuating position, the clutch and the rear body are configured such that rotation of the drive spindle rotates the nut relative to the front body to move the jaws relative to the front body;

wherein the chuck further comprises a sleeve, a spring, and a lock ring, wherein the sleeve is configured to move the clutch, against a bias of the spring, into the working position or the jaw actuation position in response to a positioning lug of the sleeve engaging with the lock ring.

10. A chuck for use with a power driver having a rotatable drive spindle, the chuck comprising:

a plurality of jaws, each jaw including jaw teeth;

a front body, wherein the plurality of jaws are configured to rotate with the front body about a center axis of the chuck, wherein the plurality of jaws are also configured to move relative to the front body in an opening or closing direction;

a nut operably coupled with at least some of the jaw teeth of the jaws such that rotation of the nut relative to the front body moves the jaws relative to the front body;

a rear body including rear body teeth, the rear body being configured to rotate with a drive spindle of the power driver, wherein the rear body teeth extend axially from the rear body and are rearward-facing away from the plurality of jaws; and a clutch including clutch teeth, the clutch being operably coupled to the front body such that the clutch rotates with the front body, wherein the clutch is configured to move between a working position and a jaw actuating position, wherein the clutch teeth extend axially from the clutch and are forward-facing toward the plurality of jaws;

wherein, in the working position, the clutch teeth are engaged with the rear body teeth such that rotation of the rear body by the drive spindle rotates the clutch, the front body, and the jaws, and wherein, in the jaw actuating position, the clutch teeth are not engaged with the rear body teeth and the rear body rotates the nut relative to the front body, and the clutch to move the jaws relative to the front body.

11. The chuck of claim 10, wherein the nut is affixed to or integrated with the rear body and wherein the jaw teeth are disposed on an internal facing surface of the jaws.

12. The chuck of claim 10, further comprising a rear sleeve operably coupled to the clutch to rotate with the clutch and move axially with the clutch, wherein the front body comprises one or more pins that operably couple with the rear sleeve to permit relative axial movement of the rear sleeve relative to the front body.

13. The chuck of claim 10 further comprising an intermediate gear;

wherein the rear body comprises a rear body gear;

wherein the nut is affixed to an inner gear;

wherein the intermediate gear is configured to operably couple the rear body gear to the inner gear to turn the nut.

14. The chuck of claim 10 further comprising a spring plunger assembly configured to maintain the clutch in the working position or the jaw actuating position.

15. The chuck of claim 14, wherein the spring plunger assembly comprises a spring biased ball that engages with the cavities of the clutch.

16. The chuck of claim 14, wherein the spring plunger assembly comprises a movable ball that rolls into and out of respective recesses to maintain the clutch in either the working position or the jaw actuation position.

17. The chuck of claim 10, wherein the clutch is configured to move parallel to the center axis and relative to the front body.

18. The chuck of claim 10, further comprising a rear sleeve, a spring, and a lock ring, wherein the rear sleeve is configured to move the clutch, against a bias of the spring, into the working position or the jaw actuation position in response to a positioning lug of the rear sleeve engaging with the lock ring.

19. The chuck of claim 10, further comprising a sleeve configured to move with the clutch into the working position or the jaw actuation position, and wherein the sleeve is configured to rotate about the center axis relative to the clutch.

* * * * *